United States Patent
Elanany et al.

(10) Patent No.: US 11,059,926 B2
(45) Date of Patent: Jul. 13, 2021

(54) ACRYLOYL-BASED COPOLYMERS, TERPOLYMERS, AND USE AS HYDRATE INHIBITORS

(71) Applicants: Saudi Arabian Oil Company, Dhahran (SA); King Fahd University of Petroleum & Minerals, Dhahran (SA)

(72) Inventors: Mohamed Elanany, Ras Tanura (SA); Abdullah Al-Malki, Dhahran (SA); Manal Al-Eid, Saihat (SA); Mohammed Al-Daous, Thuwal (SA); Shaikh Asrof Ali, Dhahran (SA); Khalid Majnouni, Dhahran (SA)

(73) Assignees: Saudi Arabian Oil Company, Dhahran (SA); King Fahd University of Petroleum & Minerals, Dhahran (SA)

( * ) Notice: Subject to any disclaimer, the term of this patent is extended or adjusted under 35 U.S.C. 154(b) by 0 days.

(21) Appl. No.: 16/710,842

(22) Filed: Dec. 11, 2019

(65) Prior Publication Data
US 2020/0115484 A1 Apr. 16, 2020

Related U.S. Application Data

(62) Division of application No. 15/585,574, filed on May 3, 2017, now Pat. No. 10,550,215.

(60) Provisional application No. 62/500,143, filed on May 2, 2017, provisional application No. 62/332,758, filed on May 6, 2016.

(51) Int. Cl.
| C09K 8/52 | (2006.01) |
| C08F 226/06 | (2006.01) |
| C10L 3/10 | (2006.01) |
| C08F 220/54 | (2006.01) |
| C08F 220/58 | (2006.01) |

(52) U.S. Cl.
CPC .......... *C08F 226/06* (2013.01); *C08F 220/54* (2013.01); *C08F 220/58* (2013.01); *C09K 8/52* (2013.01); *C10L 3/107* (2013.01); *C09K 2208/22* (2013.01); *C09K 2208/32* (2013.01)

(58) Field of Classification Search
CPC .... C08F 226/06; C08F 220/54; C08F 220/58; C08F 2/38; C08F 2/44; C08F 228/06; C10L 3/107; C09K 8/52; C09K 2208/32; C09K 2208/22
See application file for complete search history.

(56) References Cited

U.S. PATENT DOCUMENTS

| 4,221,888 A | 9/1980 | Kawakami et al. |
| 4,277,580 A | 7/1981 | Allen et al. |
| 4,363,797 A | 12/1982 | Jacquet et al. |
| 4,435,556 A | 3/1984 | Masler |
| 4,828,710 A | 5/1989 | Itoh et al. |
| 5,413,731 A | 5/1995 | Adler et al. |
| 5,432,292 A | 7/1995 | Sloan, Jr. |
| 5,841,010 A | 11/1998 | Rabeony et al. |
| 5,883,210 A * | 3/1999 | Ahmed .............. C07D 295/185 526/263 |
| 6,015,929 A | 1/2000 | Rabeony et al. |
| 6,232,273 B1 * | 5/2001 | Namba ................. C10L 1/2381 507/90 |
| 6,319,971 B1 | 11/2001 | Kelland et al. |

(Continued)

FOREIGN PATENT DOCUMENTS

| CN | 104449600 A | 3/2015 |
| EP | 256797 A1 | 2/1988 |

(Continued)

OTHER PUBLICATIONS

Office Action dated Jul. 30, 2020 pertaining to Chinese Patent Application No. 201780027876.7.
Office Action dated Jul. 1, 2020 pertaining to Chinese Patent Application No. 201780027637.1.
Office Action dated Mar. 31, 2020 pertaining to U.S. Appl. No. 15/585,558, filed May 3, 2017, 22 pgs.
Office Action dated Dec. 10, 2020 pertaining to U.S. Appl. No. 16/728,245, filed Dec. 27, 2019, 39 pgs.
Office Action dated Dec. 24, 2020 pertaining to Chinese Patent Application No. 201780027848.5.
International Search Report and Written Opinion dated Aug. 6, 2017 for PCT/US2017/029283 Filed May 30, 2017. pp. 1-18.

(Continued)

*Primary Examiner* — Kumar R Bhushan
(74) *Attorney, Agent, or Firm* — Dinsmore & Shohl LLP

(57) ABSTRACT

Copolymers having General Formula (I):

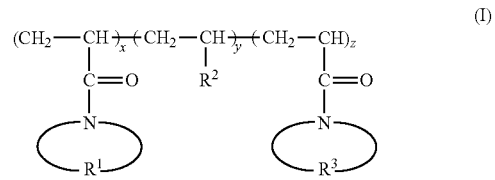

in which $R^1$ and $R^3$ are chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combinations thereof, where the divalent $C_4$-$C_7$ heteroaliphatic groups of $R^1$ and $R^3$ include one or two heteroatoms independently chosen from O, N, and S, and the maximum number of heteroatoms in $R^1$ or $R^3$ is two, $R^2$ is chosen from $Q^1$ and $Q^2$, x is a molar fraction range chosen from 0.1 to 0.9, y is a molar fraction range chosen from 0.1 to 0.9, and z is a molar fraction range chosen from 0 to 0.8, where the summation of x, y, and z equals 1. Methods for inhibiting formation of clathrate hydrates include contacting a fluid with at least one copolymer of General Formula (I).

10 Claims, 8 Drawing Sheets

(56) References Cited

U.S. PATENT DOCUMENTS

| | | |
|---|---|---|
| 6,593,408 B1 | 7/2003 | Takaki et al. |
| 7,183,240 B2 | 2/2007 | Dahlmann et al. |
| 7,214,814 B2 | 5/2007 | Dahlmann et al. |
| 7,297,823 B2 | 11/2007 | Dahlmann et al. |
| 7,381,689 B2 | 6/2008 | Panchalingam et al. |
| 7,662,970 B2 | 2/2010 | Rivers et al. |
| 7,837,746 B2 | 11/2010 | Rivers et al. |
| 7,893,009 B2 | 2/2011 | Leinweber et al. |
| 7,968,500 B2 | 6/2011 | Pakulski et al. |
| 8,034,748 B2 | 10/2011 | Dahlmann et al. |
| 9,145,465 B2 | 9/2015 | Spencer et al. |
| 2003/0018152 A1 | 1/2003 | Angel et al. |
| 2004/0024152 A1 | 2/2004 | Toyama et al. |
| 2006/0025603 A1 | 2/2006 | Quinlin et al. |
| 2006/0205603 A1 | 9/2006 | Colle et al. |
| 2008/0177103 A1 | 7/2008 | Leinweber et al. |
| 2008/0221271 A1 | 9/2008 | Duggal et al. |
| 2010/0209476 A1 | 8/2010 | Lim et al. |
| 2011/0152130 A1 | 6/2011 | Adidharma et al. |
| 2012/0080643 A1 | 4/2012 | Leinweber et al. |
| 2013/0098623 A1* | 4/2013 | Spencer .............. C08F 220/34 166/310 |
| 2013/0123147 A1 | 5/2013 | Musa et al. |
| 2013/0261275 A1 | 10/2013 | Musa et al. |
| 2014/0148337 A1 | 5/2014 | Schnabel et al. |
| 2015/0322330 A1 | 11/2015 | Spencer et al. |

FOREIGN PATENT DOCUMENTS

| | | |
|---|---|---|
| EP | 161882 B1 | 8/1989 |
| EP | 163404 B1 | 6/1990 |
| GB | 2301825 A | 12/1996 |
| JP | 11092787 A | 4/1999 |
| JP | 2003137916 A | 5/2003 |
| JP | 3851682 B2 | 11/2006 |
| WO | 9325798 A1 | 12/1993 |
| WO | 9608672 A1 | 3/1996 |
| WO | 9641785 A1 | 12/1996 |
| WO | 9819980 A1 | 5/1998 |

OTHER PUBLICATIONS

International Search Report and Written Opinion dated Jul. 12, 2017 for PCT/US2017/030795 Jul. 30, 2017. Pages 1-10.
International Search Report and Written Opinion dated Jul. 27, 2017 for PCT/US2017/030794 Filed Jul. 20, 2017. pp. 1-9.
"Design, Synthesis, and Aqueous Aggregation Behavior of Nonionic Single and Multiple Thermoresponsive Polymers", Katja Skrabania, et al., Langmuir 2007, vol. 23, Jan. 1, 2007, pp. 84-93.
"Temperature Sensitization of Liposomes by Use of N-Isopropylacrylamide Copolymers with Varying Transition Endotherms", Keisuke Yoshino, et al., Bioconjugate Chem. 2004, Sep. 1, 2004, pp. 1102-1109.
"Thermosensitive polymer-modified liposomes that release contents around physiological temperature", Kenji Kono, et al., Biochimica et Biophysica Acta, Jan. 1, 1999, pp. 239-250.
"Poly(glycidyl methacrylate): a highly versatile polymeric building block for post-polymerization modifications", Polym. Chem., 2013, 4, 124.
Election/Restriction dated Oct. 26, 2017 for U.S. Appl. No. 15/584,389, filed May 2, 2017.
Office Action dated Mar. 9, 2018 pertaining to U.S. Appl. No. 15/584,389.
International Search Report and Written Opinion dated Sep. 19, 2017 pertaining to International Application No. PCT/US2017030373.
Office Action dated May 10, 2018 pertaining to U.S. Appl. No. 15/584,382, 20 pages.
Election/Restriction dated Feb. 1, 2018 for U.S. Appl. No. 15/584,382, filed May 2, 2017.
Election/Restriction dated May 17, 2018 for U.S. Appl. No. 15/585,558, filed May 3, 2017.
Yoshida et al., "Modulating the phase transition temperature and thermosensitivity in N-isopropylacrylamide copolymer gels", J. Biomater. Sci. Polymer Edn, vol. 6, No. 6, pp. 585-598, 1994.
Election/Restriction Requirement dated Jul. 20, 2018 pertaining to U.S. Appl. No. 15/585,574.
Office Action dated Aug. 1, 2018 pertaining to U.S. Appl. No. 15/585,558.
Office Action pertaining to U.S. Appl. No. 15/585,574 dated Sep. 27, 2018.
International Preliminary Report on Patentability pertaining to PCT/US2017/030795 dated Nov. 6, 2018.
International Preliminary Report on Patentability pertaining to PCT/US2017/030794 dated Nov. 6, 2018.
International Preliminary Report on Patentability pertaining to PCT/US2017/030373 dated Nov. 6, 2018.
Final Office Action dated Nov. 29, 2018 pertaining to U.S. Appl. No. 15/585,558, 17 pages.
Final Office Action dated Nov. 16, 2018 pertaining to U.S. Appl. No. 15/584,389, 24 pages.
GCC Examination Report dated Feb. 11, 2019 pertaining to GC Application No. 2017-33343 filed May 4, 2017, 4 pgs.
Advisory Action dated May 30, 2019 pertaining to U.S. Appl. No. 15/585,574, filed May 3, 2017, 7 pgs.
U.S. Office Action dated Jun. 27, 2019 pertaining to U.S. Appl. No. 15/584,389, filed May 2, 2017, 33 pgs.
Office Action pertaining to application No. GC 2017-33342 dated Jun. 26, 2019.
Office Action pertaining to U.S. Appl. No. 15/585,558 dated Sep. 20, 2019.
https://en.wikipedia.org/wiki/Thioglycolic_acid downloaded on Sep. 16, 2019.
Notice of Allowance and Fee(s) Due dated Oct. 10, 2019 pertaining to U.S. Appl. No. 15/585,574, filed May 3, 2017, 36 pgs.
Arabiyah & Habash Offshore & Onshore Facilities, Loss Prevention Plan for Fabrication Activities at Karimun Fabrication Yard, 2012, Saudi Aramco.
Examination Report pertaining to Application No. GC 2017-33341 dated Apr. 15, 2019.
Masayuki Tomida et al., "Convenient synthesis of high molecular weight poly(succinimide) by acid-catalysed polycondensation of L-aspartic acid" Polymer, vol. 38, No. 18, 1997, pp. 4733-4736.
Second Examination Report for Application No. 2017/33343 dated Jul. 3, 2019.
Office Action dated Mar. 18, 2019 pertaining to U.S. Appl. No. 5/585,574, 22 pages.
Office Action dated Mar. 22, 2019 pertaining to U.S. Appl. No. 15/585,558, 21 pages.
Office Action dated Feb. 5, 2021 pertaining to Korean Patent Application No. 10-2018-7035421.
Office Action dated Sep. 30, 2020 pertaining to European Patent Application No. 17723838.3.
Examination Report dated Jan. 10, 2020 pertaining to GCC Patent Application No. 2017/33342.
Office Action dated Jun. 8, 2020 pertaining to European Patent Application No. 17739724.7.
Examination Report dated Jun. 9, 2020 pertaining to GCC Patent Application No. 2017/33341.
Office Action dated Jul. 14, 2020 pertaining to U.S. Appl. No. 15/585,558, filed May 3, 2017, 13 pgs.
Ali, S. et al.; Synthesis and evaluation of phosphate-free antiscalants to control CaSO4 2H20 scale formation in reverse osmosis desalination plants; Desalination; 2015, pp. 36-44; vol. 357; Elsevier.
Office Action dated Mar. 1, 2021 pertaining to Chinese Patent Application No. 201780027637.1.
Kaman Notice of Preliminary Rejection dated Mar. 30, 2021 pertaining to Korean Patent Application No. 10-2018-7035325, 9 pgs.

* cited by examiner

ACRYLOYL-BASED COPOLYMERS, TERPOLYMERS, AND USE AS HYDRATE INHIBITORS

CROSS REFERENCE TO RELATED APPLICATIONS

This application is a divisional of U.S. Non-Provisional application Ser. No. 15/585,574 filed May 3, 2017, which claims priority to U.S. Provisional Application No. 62/332,758, filed May 6, 2016 and to U.S. Provisional Application No. 62/500,143, filed May 2, 2017, which are incorporated by reference in their entirety.

TECHNICAL FIELD

The present disclosure generally relates to acryloyl-based copolymers and terpolymers, to methods for synthesizing copolymers and terpolymers, and to methods for inhibiting formation of clathrate hydrates.

BACKGROUND

Conditions favoring formation of clathrate hydrates are often found in pipelines. With the expansion of offshore gas exploration and production, the formation of clathrate hydrates has become a serious operational concern in both gas transportation and gas processing. Agglomeration and adherence of clathrate hydrates to pipeline walls can reduce gas production, plug sections of the pipeline, and even block the pipeline, thereby leading to a pipeline shutdown. In order to maintain gas production and avoid pipeline shutdown, clathrate hydrate inhibitors have been added to pipeline fluids.

Commercially available clathrate hydrate inhibitors include thermodynamic hydrate inhibitors (that is, THIs), which act to modify the conditions at which clathrate hydrates form in pipeline fluids. For example, THIs may be added to pipeline fluids at high concentrations (for example, up to 0.8 weight/weight, that is w/w of the water cut) to modify the pressure, temperature, or a combination of the pressure and temperature at which clathrate hydrates form. Ethylene glycol (that is, monoethylene glycol or MEG) and methanol are examples of THIs. Another type of commercially available clathrate hydrate inhibitors are low dose hydrate inhibitors (that is, LDHIs), which act to: (1) kinetically delay clathrate hydrate nucleation, and (2) inhibit clathrate hydrate growth. With regard to kinetically delaying clathrate hydrate nucleation, LDHIs may interact with clathrate hydrate nuclei during early formation of clathrate hydrates. With regard to inhibiting clathrate hydrate growth, LDHIs may inhibit clathrate hydrate growth by binding to a surface of the clathrate hydrate. Poly(N-vinylcaprolactam) and poly(N-methyl-N-vinylacetamide) are examples of LDHIs. A third type of commercially available clathrate hydrate inhibitors are anti-agglomerates (that is, AAs), which act to inhibit clathrate hydrate agglomeration. With regard to inhibiting clathrate hydrate agglomeration, AAs may inhibit clathrate hydrate agglomeration by adsorbing to clathrate hydrates to prevent massive accumulation of clathrate hydrates. In one or more embodiments, AAs may inhibit clathrate hydrate agglomeration such that clathrate hydrates are kept in the form of a suspension. Examples of AAs are anti-agglomerates based on quaternary ammonium cations.

Recently, THIs have been replaced by commercially available LDHIs, because THIs are viewed as being difficult to separate from pipeline fluids, are harmful to the environment, and require high concentrations to be effective. However, commercially available LDHIs are also imperfect in that some are inefficient or incompatible with other additives, for example, corrosion inhibitors. Further, commercially available LDHIs which are capable of inhibiting clathrate hydrates having a structure (Type) I (that is, SI) crystalline structure under severe conditions, for example, extreme subcooling temperatures and pressure, are limited. Moreover, commercially available LDHIs, which are capable of inhibiting clathrate hydrates having a SI crystalline structure, are limited to a narrow subcooling temperature range. Also, AAs are imperfect in that they fail to inhibit formation of clathrate hydrates.

SUMMARY

In view of the Background, there is an ongoing need for clathrate hydrate inhibitors and for methods of inhibiting clathrate hydrate formation. Embodiments of the present disclosure are directed to copolymers and terpolymers having General Formula (I):

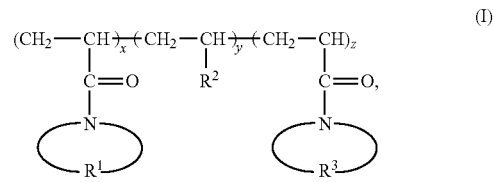

in which: $R^1$ and $R^3$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where: the divalent $C_4$-$C_7$ heteroaliphatic groups of $R^1$ and $R^3$ include one or two heteroatoms independently chosen from O, N, and S, and the maximum number of heteroatoms in $R^1$ or $R^3$ is two; $R^2$ is chosen from $Q^1$ and $Q^2$:

in which: $R^4$ and $R^5$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where: the divalent $C_4$-$C_7$ heteroaliphatic groups of $R^4$ and $R^5$ include one or two heteroatoms independently chosen from O, N, and S, and the maximum number of heteroatoms in $R^4$ or $R^5$ is two; x is a molar fraction range chosen from 0.1 to 0.9; y is a molar fraction range chosen from 0.1 to 0.9; and z is a molar fraction range chosen from 0 to 0.8, where the summation of x, y, and z equals 1.

Embodiments of the present disclosure are also directed to methods for inhibiting formation of clathrate hydrates in a fluid capable of forming the clathrate hydrates, the method including: contacting the fluid with at least one copolymer or terpolymer of General Formula (I) under conditions suitable for forming the clathrate hydrates:

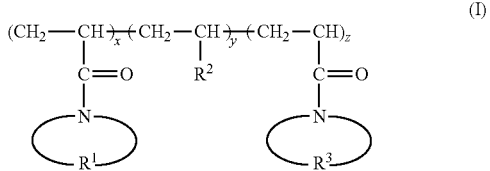

(I)

in which: $R^1$ and $R^3$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where: the divalent $C_4$-$C_7$ heteroaliphatic groups of $R^1$ and $R^3$ include one or two heteroatoms independently chosen from O, N, and S, and the maximum number of heteroatoms in $R^1$ or $R^3$ is two; $R^2$ is chosen from $Q^1$ and $Q^2$:

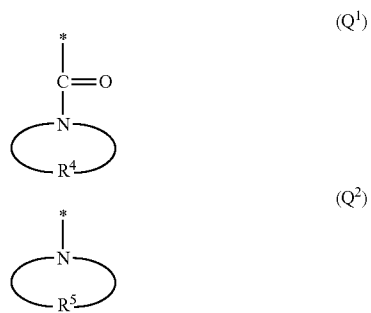

in which: $R^4$ and $R^5$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where: the divalent $C_4$-$C_7$ heteroaliphatic groups of $R^4$ and $R^5$ include one or two heteroatoms independently chosen from O, N, and S, and the maximum number of heteroatoms in $R^4$ or $R^5$ is two; x is a molar fraction range chosen from 0.1 to 0.9; y is a molar fraction range chosen from 0.1 to 0.9; and z is a molar fraction range chosen from 0 to 0.8, where the summation of x, y, and z equals 1.

Additional features and advantages of the described embodiments in this disclosure will be set forth in the Detailed Description which follows, and in part will be readily apparent to those skilled in the art from that description or recognized by practicing the embodiments described in this disclosure, including the Detailed Description which follows, the claims, as well as the appended drawings.

It is to be understood that both the foregoing general description and the following Detailed Description describe various embodiments and are intended to provide an overview or framework for understanding the nature and character of the claimed subject matter. The accompanying drawings are included to provide a further understanding of the various embodiments, and are incorporated into and constitute a part of this disclosure. The drawings illustrate the various embodiments described in this disclosure, and together with the Detailed Description serve to explain the principles and operations of the claimed subject matter.

DETAILED DESCRIPTION

Figure 1:
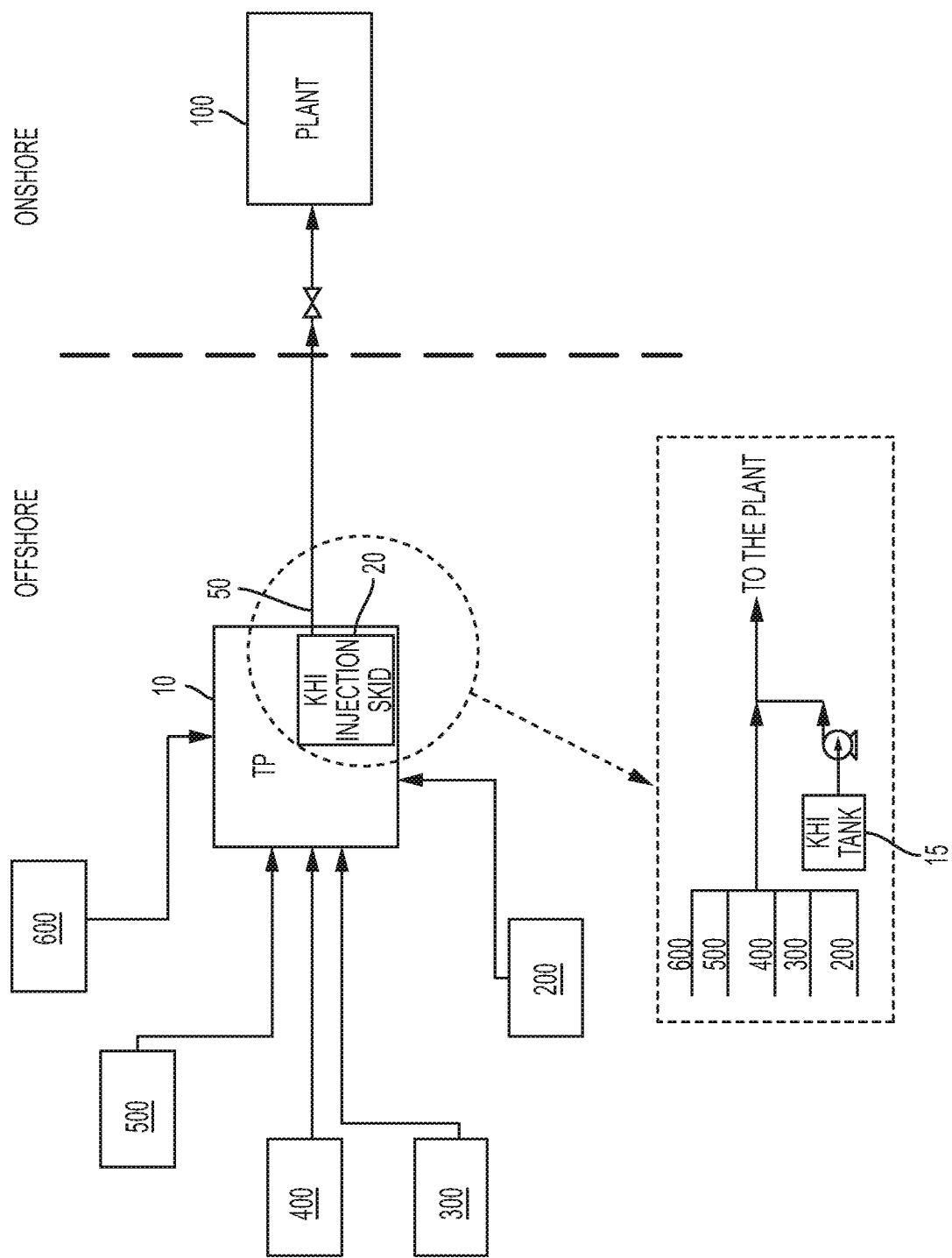
FIG. 1 is a schematic depicting an offshore tie-in-platform in fluidic communication with wellheads and with an onshore plant via pipelines, where the tie-in-platform includes a receptacle for holding clathrate hydrate inhibitors.

While the following terms are believed to be well understood by one of ordinary skill in the art, definitions are set forth to facilitate explanation of the presently-disclosed subject matter.

The term "copolymer" refers to a polymer having two or more different monomeric repeating units. For example, the copolymer may include two different monomeric repeating units (that is, a bipolymer). Alternatively, the copolymer may include three different monomeric repeating units (that is, a terpolymer). In one or more embodiments, the copolymers are random. As will be appreciated by one of ordinary skill in the art, the copolymers are random when the distribution of monomeric repeating units follows statistical laws. For example, copolymers are random when the probability of finding a given monomeric repeating unit at a particular point in the polymer chain is equal to the mole fraction of that monomeric repeating unit in the chain. Random copolymers may also be referred to as statistical copolymers.

The term "monovalent" refers to a radical having an unsatisfied valence of one, where a valence "-" is unsatisfied at one end of the radical. For example, in embodiments where a hydrocarbon group is present at one end of an aliphatic radical or a heteroaliphatic radical, the aliphatic radical or the heteroaliphatic radical is monovalent when one hydrogen atom has been removed from the hydrocarbon group present at one end of the aliphatic radical or the heteroaliphatic radical. As another example, in embodiments where a heteroatom is present at one end of the heteroaliphatic radical, the heteroaliphatic radical is monovalent when the heteroatom present at one end of the heteroaliphatic radical has an unsatisfied valence "-".

The term "divalent" refers to a radical having an unsatisfied valence of two, where a valence "-" is unsatisfied at two ends of the radical. For example, in embodiments where a hydrocarbon group is present at two ends of an aliphatic radical or a heteroaliphatic radical, the aliphatic radical or the heteroaliphatic radical is divalent when one hydrogen atom has been removed from each of the hydrocarbon groups present at two ends of the aliphatic radical or the heteroaliphatic radical. As another example, in embodiments where a heteroatom is present at two ends of the heteroaliphatic radical, the heteroaliphatic radical is divalent when each of the heteroatoms present at two ends of the heteroaliphatic radical has an unsatisfied valence "-" Similarly, as another example, in embodiments where a hydrocarbon group is present at one end of a heteroaliphatic radical and a heteroatom is present at one end of the heteroaliphatic radical, the heteroaliphatic radical is divalent when one hydrogen atom has been removed from the hydrocarbon group present at one end of the heteroaliphatic radical and when the heteroatom present at one end of the heteroaliphatic radical has an unsatisfied valence "-".

The term "aliphatic" refers to saturated straight chain (that is, linear or unbranched) and branched hydrocarbon radicals. In embodiments, the aliphatic hydrocarbon radicals are monovalent or divalent. As will be appreciated by one of ordinary skill in the art, aliphatic is intended to include, but is not limited to, alkyl moieties. Thus, the term "alkyl" includes straight and branched alkyl groups. In certain embodiments, the term "lower alkyl" may be used to indicate alkyl groups (branched or unbranched) having from 1 to 6 carbon atoms.

In embodiments, the alkyl groups described contain from 1 to 7 aliphatic carbon atoms. In other embodiments, the alkyl groups described contain from 1 to 5 aliphatic carbon atoms. In still other embodiments, the alkyl groups described contain from 1 to 3 aliphatic carbon atoms. Illustrative aliphatic groups thus include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like.

The term "heteroaliphatic" refers to aliphatic radicals in which one or more carbon atoms in the main chain have been substituted with a heteroatom. By way of example, an aliphatic radical having four main chain atoms where one carbon atom has been substituted with one heteroatom is referred to as a $C_4$ heteroaliphatic. As another example, an aliphatic radical having seven main chain atoms where two carbon atoms have been substituted with two heteroatoms is referred to as a $C_7$ heteroaliphatic. In embodiments, the heteroaliphatic radicals are monovalent or divalent. Thus, heteroaliphatic is intended to include aliphatic chains which contain one or more oxygen, sulfur, or nitrogen atoms, for example, in place of carbon atoms. Heteroaliphatic moieties may be linear or branched.

The term "heterocycloalkyl," "heterocycle," or "heterocyclic" refers to radicals that combine the properties of heteroaliphatic and cyclic moieties and include, but are not limited to, saturated mono- or polycyclic ring systems having from 5 to 8 atoms, where at least one ring atom is a N heteroatom; and where zero, one or two ring atoms are additional heteroatoms independently chosen from S, O, and N (where the nitrogen and sulfur heteroatoms may optionally be oxidized). In certain embodiments, the terms heterocycloalkyl, heterocycle or heterocyclic refer to non-aromatic 5-membered, 6-membered, or 7-membered rings or polycyclic moieties where at least one ring atom is a N heteroatom, and where zero, one or two ring atoms are additional heteroatoms independently chosen from S, O, and N (where the nitrogen and sulfur heteroatoms may optionally be oxidized and the nitrogen atom may be quarternized) including, but not limited to, bicyclic or tricyclic groups. Representative heterocycles include, but are not limited to, heterocycles such as pyrrolidinyl, pyrazolidinyl, imidazolidinyl, piperidinyl, piperazinyl, oxazolidinyl, isoxazolidinyl, morpholinyl, thiazolidinyl, isothiazolidinyl, dithiazolyl, dithiazolidinyl, and azepanyl. In embodiments, the heterocycloalkyls, heterocycles or heterocyclics are saturated mono- or polycyclic moieties having from 5 to 8 ring atoms of which one ring atom is N; and of which zero, one or two ring atoms are additional heteroatoms independently chosen from S, O, and N; and the remaining ring atoms are carbon, the radicals being joined to the rest of the molecule via a N ring atom, such as, for example, pyrrolidinyl, pyrazolidinyl, imidazolidinyl, piperidinyl, piperazinyl, morpholinyl, thiazolidinyl, and azepanyl.

The term "clathrate hydrates" refers to crystalline water-based solids in which host water molecules enclathrate gas guest molecules. In one or more embodiments, crystalline water-based solids in which host water molecules are hydrogen bonded around the gas guest molecules such that the gas guest molecules are trapped inside cages of hydrogen bonded host water molecules. The clathrate hydrates may include a structure (Type) I (that is, SI), a structure (Type) II (that is, SII), or a structure (Type) H (that is, SH) crystalline structure.

The terms "inhibit", "inhibition", and "inhibiting" refer to any improvement in controlling, delaying, reducing, mitigating, preventing, or combination thereof the formation, growth, adherence, agglomeration, or combination thereof of clathrate hydrates in any manner. For example, clathrate hydrate inhibition includes, but should not be limited to, thermodynamically modifying the conditions at which clathrate hydrates form, kinetically delaying clathrate hydrate nucleation, dissolving clathrate hydrates, breaking up clathrate hydrates, or combination thereof. Further, clathrate hydrate inhibition may include the complete cessation of clathrate hydrate formation, where clathrate hydrate formation is entirely prevented.

The terms "formation", "forming", and "form" refer to any process in which host water molecules enclathrate gas guest molecules in a crystalline structure, in which clathrate hydrates grow, in which clathrate hydrates adhere, in which clathrate hydrates agglomerate, or combinations thereof. The term "enclathrate" refers to hydrogen bonding of host water molecules around gas guest molecules.

The terms "subcooling temperature" and "$T_{sc}$" refer to the difference between an operating temperature of a field gas and the three-phase equilibrium temperature of the clathrate hydrate of the field gas at 140 bars. Thus, the term "first subcooling temperature" refers to the difference between an operating temperature of a field gas in a first operation stage and the three-phase equilibrium temperature. In embodiments, the first subcooling temperature is from about 0° C. to about 4.0° C., or from about 0° C. to about 1.0° C., or from about 1.0° C. to about 2.0° C., or from about 2.0° C. to about 3.5° C., or about 4.0° C. Similarly, the term "second subcooling temperature" refers to the difference between an operating temperature of a field gas in a second operation stage and the three-phase equilibrium temperature. In embodiments, the second subcooling temperature is from about 4.0° C. to about 5.6° C., or from about 4.0° C. to about 4.6° C., or from about 4.6° C. to about 5.0° C., or from about 5.0° C. to about 5.6° C., or about 5.6° C. Additionally, the term "third subcooling temperature" refers to the difference between an operating temperature of a field gas in a third operation stage and the three-phase equilibrium temperature. In embodiments, the third subcooling temperature is from about 5.6° C. to about 10.5° C., or from about 5.6° C. to about 7.0° C., or from about 7.0° C. to about 8.6° C., or from about 8.6° C. to about 10.0° C., or about 10.5° C.

Embodiments of the present disclosure are directed toward acryloyl-based copolymers (that is, ABC) having General Formula (I), to methods for synthesizing acryloyl-based copolymers having General Formula (I), and to methods for inhibiting formation of clathrate hydrates using acryloyl-based copolymers having General Formula (I). Embodiments of the acryloyl-based copolymers having General Formula (I) will now be described in detail. Thereafter, embodiments of methods for synthesizing copolymers of General Formula (I) will be described. Then, methods for inhibiting formation of clathrate hydrates using acryloyl-based copolymers having General Formula (I) will be described with reference to FIG. 1.

I. Acryloyl-Based Copolymers of General Formula (I)

In one or more embodiments, the disclosure describes acryloyl-based copolymers having General Formula (I):

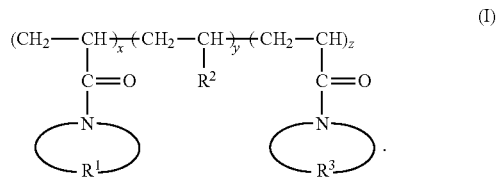

In the copolymers of General Formula (I), $R^1$ and $R^3$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where the divalent $C_4$-$C_7$ heteroaliphatic groups of $R^1$ and $R^3$ include one or two heteroatoms independently chosen from O, N, and S, and the maximum number of heteroatoms in $R^1$ or $R^3$ is two.

Additionally, in the copolymers of General Formula (I), $R^2$ is chosen from $Q^1$ and $Q^2$:

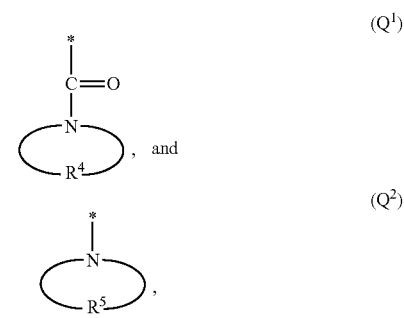

in which: $R^4$ and $R^5$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where: the divalent $C_4$-$C_7$ heteroaliphatic groups of $R^4$ and $R^5$ include one or two heteroatoms independently chosen from O, N, and S, and the maximum number of heteroatoms in $R^4$ or $R^5$ is two. Also in the copolymers of General Formula (I), x is a molar fraction range chosen from about 0.1 to about 0.9; y is a molar fraction range chosen from about 0.1 to about 0.9; and z is a molar fraction range chosen from 0 to about 0.8, where the summation of x, y, and z equals 1.

In the copolymers of General Formula (I), $R^1$ is chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where the divalent $C_4$-$C_7$ heteroaliphatic groups of $R^1$ include one or two heteroatoms independently chosen from O, N, and S, and the maximum number of heteroatoms in $R^1$ is two. In embodiments, $R^1$ is chosen from divalent $C_4$-$C_7$ linear aliphatic groups, divalent $C_4$-$C_7$ branched aliphatic groups, divalent $C_4$-$C_7$ linear heteroaliphatic groups, and divalent $C_4$-$C_7$ branched heteroaliphatic groups. In embodiments, $R^1$ is chosen from divalent $C_4$-$C_6$ linear aliphatic groups and divalent $C_4$-$C_6$ linear heteroaliphatic groups. In other embodiments, $R^1$ is chosen from divalent $C_4$-$C_6$ linear heteroaliphatic groups. In still other embodiments, $R^1$ is chosen from divalent $C_4$-$C_6$ linear heteroaliphatic groups including one heteroatom, where the heteroatom is O. In illustrative, non-limiting embodiments, $R^1$ is chosen from —$(CH_2)_4$—, —$(CH_2)_5$—, and —$(CH_2)_2$—O—$(CH_2)_2$—.

In one or more embodiments, $R^1$ is optionally substituted with one or more substituting groups. In embodiments where $R^1$ is substituted with one or more substituting groups, $R^1$ may include from 1 to 3 substituting groups. In embodiments where $R^1$ is chosen from divalent $C_4$-$C_7$ aliphatic groups and divalent $C_4$-$C_7$ heteroaliphatic groups and is substituted with one or more substituting groups, the divalent $C_4$-$C_7$ aliphatic groups and the divalent $C_4$-$C_7$ heteroaliphatic groups include additional unsatisfied valences "-" within the divalent $C_4$-$C_7$ aliphatic groups and the divalent $C_4$-$C_7$ heteroaliphatic groups to accommodate bonding with the substituting groups. For example, in embodiments where $R^1$ is chosen from divalent $C_4$-$C_7$ aliphatic groups and divalent $C_4$-$C_7$ heteroaliphatic groups and is substituted, additional hydrogen atoms may have been removed from the hydrocarbon groups present within the divalent $C_4$-$C_7$ aliphatic groups and the divalent $C_4$-$C_7$ heteroaliphatic groups to accommodate bonding with the substituting groups.

In embodiments, $R^1$ is optionally substituted with one or more $C_1$-$C_6$ aliphatic groups, heteroatoms independently chosen from O, N, and S, or combination thereof. In embodiments, $R^1$ is optionally substituted with one or more $C_1$-$C_6$ linear aliphatic groups, $C_1$-$C_6$ branched aliphatic groups, heteroatoms independently chosen from O, N, and S, or combination thereof. In embodiments, $R^1$ is substituted with one or more $C_1$-$C_6$ linear aliphatic groups, $C_1$-$C_6$ branched aliphatic groups, or combination thereof. In illustrative, non-limiting embodiments, $R^1$ is substituted with one or more lower alkyls. In other illustrative, non-limiting embodiments, $R^1$ is substituted with one or more $C_1$-$C_3$ linear aliphatic groups, $C_1$-$C_3$ branched aliphatic groups, or combination thereof. In still other illustrative, non-limiting embodiments, $R^1$ is substituted with one or more substituting groups independently chosen from methyl, ethyl, n-propyl, isopropyl, allyl moieties, or combination thereof.

In other embodiments, $R^1$ is substituted with one or more heteroatoms independently chosen from O, N, and S. In embodiments where $R^1$ is substituted with one or more heteroatoms independently chosen from O, N, and S, the heteroatoms may form a single bond or a double bond with $R^1$. In illustrative, non-limiting embodiments, $R^1$ is substituted with one heteroatom chosen from O, N, and S. In other illustrative, non-limiting embodiments, $R^1$ is substituted with one heteroatom, where the one heteroatom is O.

In embodiments where $R^1$ is chosen from divalent $C_4$-$C_7$ aliphatic groups and divalent $C_4$-$C_7$ heteroaliphatic groups, the $C_4$-$C_7$ aliphatic groups and the $C_4$-$C_7$ heteroaliphatic groups include an unsatisfied valence "-" at two ends. In this way, $R^1$ forms a heterocycloalkyl or a heterocycle when bonded with the —N— in the rest of the copolymer molecule via its two unsatisfied end valences. In embodiments, the heterocycloalkyl or heterocycle formed when $R^1$ is bonded with the —N— in the rest of the copolymer is non-aromatic. In illustrative, non-limiting embodiments, the heterocycloalkyl or heterocycle formed is chosen from pyrollidinyl, pyrazolidinyl, imidazolidinyl, piperidinyl, piperazinyl, morpholinyl, thiazolidinyl, and azepanyl. In further illustrative, non-limiting embodiments, the heterocycloalkyl, or heterocycle formed is chosen from pyrrolidinyl, piperidinyl, morpholinyl, and azepanyl.

In embodiments, the heterocycloalkyl or heterocycle formed when $R^1$ is bonded with the —N— in the rest of the copolymer molecule has the following structure:

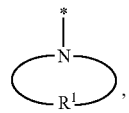

where the heterocycloalkyl or heterocycle is attached to the rest of the copolymer molecule via*. In embodiments, the

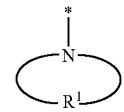

is substituted. In illustrative, non-limiting embodiments, the

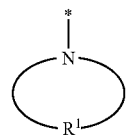

is chosen from

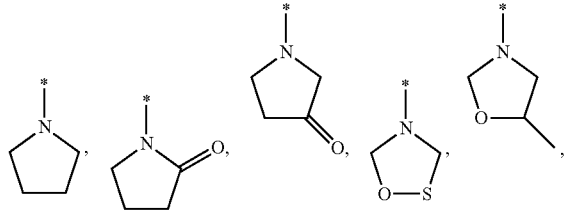

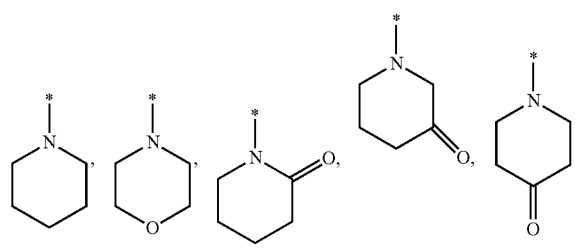

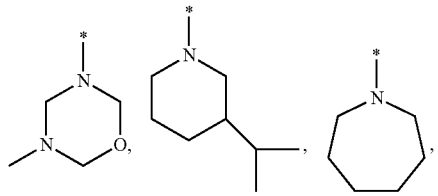

-continued

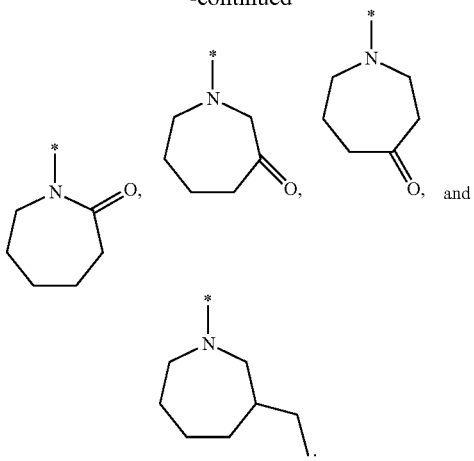

In other illustrative, non-limiting embodiments, the

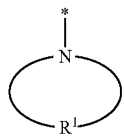

is chosen from

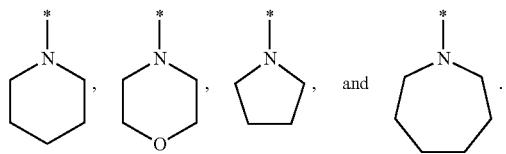

In the copolymers of General Formula (I), $R^3$ is chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where the divalent $C_4$-$C_7$ heteroaliphatic groups of $R^3$ include one or two heteroatoms independently chosen from O, N, and S, and the maximum number of heteroatoms in $R^3$ is two. In embodiments, $R^3$ is chosen from divalent $C_4$-$C_7$ linear aliphatic groups, divalent $C_4$-$C_7$ branched aliphatic groups, divalent $C_4$-$C_7$ linear heteroaliphatic groups, and divalent $C_4$-$C_7$ branched heteroaliphatic groups. In embodiments, $R^3$ is chosen from divalent $C_4$-$C_6$ linear aliphatic groups and divalent $C_4$-$C_6$ linear heteroaliphatic groups. In other embodiments, $R^3$ is chosen from divalent $C_4$-$C_6$ linear aliphatic groups. In illustrative, non-limiting embodiments, $R^3$ is —(CH$_2$)$_4$—.

In one or more embodiments, $R^3$ is optionally substituted with one or more substituting groups. In embodiments where $R^3$ is substituted with one or more substituting groups, $R^3$ may include from 1 to 3 substituting groups. In embodiments where $R^3$ is chosen from divalent $C_4$-$C_7$ aliphatic groups and divalent $C_4$-$C_7$ heteroaliphatic groups and is substituted with one or more substituting groups, the divalent $C_4$-$C_7$ aliphatic groups and the divalent $C_4$-$C_7$ heteroaliphatic groups include additional unsatisfied valences "-" within the divalent $C_4$-$C_7$ aliphatic groups and the divalent $C_4$-$C_7$ heteroaliphatic groups to accommodate bonding with the substituting groups. For example, in embodiments where $R^3$ is chosen from divalent $C_4$-$C_7$ aliphatic groups and divalent $C_4$-$C_7$ heteroaliphatic groups and is substituted, additional hydrogen atoms may have been removed from the hydrocarbon groups present within the divalent $C_4$-$C_7$ aliphatic groups and the divalent $C_4$-$C_7$ heteroaliphatic groups to accommodate bonding with the substituting groups.

In embodiments, $R^3$ is optionally substituted with one or more $C_1$-$C_6$ aliphatic groups, heteroatoms independently chosen from O, N, and S, or combination thereof. In embodiments, $R^3$ is optionally substituted with one or more $C_1$-$C_6$ linear aliphatic groups, $C_1$-$C_6$ branched aliphatic groups, heteroatoms independently chosen from O, N, and S, or combination thereof. In embodiments, $R^3$ is substituted with one or more $C_1$-$C_6$ linear aliphatic groups, $C_1$-$C_6$ branched aliphatic groups, or combination thereof. In illustrative, non-limiting embodiments, $R^3$ is substituted with one or more lower alkyls. In other illustrative, non-limiting embodiments, $R^3$ is substituted with one or more $C_1$-$C_3$ linear aliphatic groups, $C_1$-$C_3$ branched aliphatic groups, or combination thereof. In still other illustrative, non-limiting embodiments, $R^3$ is substituted with one or more substituting groups independently chosen from methyl, ethyl, n-propyl, isopropyl, allyl moieties, or combinations thereof.

In other embodiments, $R^3$ is substituted with one or more heteroatoms independently chosen from O, N, and S. In embodiments where $R^3$ is substituted with one or more heteroatoms independently chosen from O, N, and S, the heteroatoms may form a single bond or a double bond with $R^3$. In illustrative, non-limiting embodiments, $R^3$ is substituted with one heteroatom chosen from O, N, and S. In other illustrative, non-limiting embodiments, $R^3$ is substituted with one heteroatom, where the one heteroatom is O.

In embodiments where $R^3$ is chosen from divalent $C_4$-$C_7$ aliphatic groups and divalent $C_4$-$C_7$ heteroaliphatic groups, the $C_4$-$C_7$ aliphatic groups and the $C_4$-$C_7$ heteroaliphatic groups include an unsatisfied valence "-" at two ends. In this way, $R^3$ forms a heterocycloalkyl or a heterocycle when bonded with the —N— in the rest of the copolymer molecule via its two unsatisfied end valences. In embodiments, the heterocycloalkyl or heterocycle formed when $R^3$ is bonded with the —N— in the rest of the copolymer is non-aromatic. In illustrative, non-limiting embodiments, the heterocycloalkyl or heterocycle formed is chosen from pyrollidinyl, pyrazolidinyl, imidazolidinyl, piperidinyl, piperazinyl, morpholinyl, thiazolidinyl, and azepanyl. In further illustrative, non-limiting embodiments, the heterocycloalkyl, or heterocycle formed is chosen from pyrrolidinyl, piperidinyl, morpholinyl, and azepanyl.

In embodiments, the heterocycloalkyl or heterocycle formed when $R^3$ is bonded with the —N— in the rest of the copolymer molecule has the following structure:

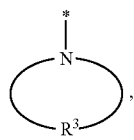

where the heterocycloalkyl or heterocycle is attached to the rest of the copolymer molecule via*. In embodiments, the

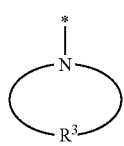

is substituted. In illustrative, non-limiting embodiments, the

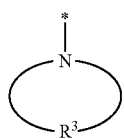

is chosen from

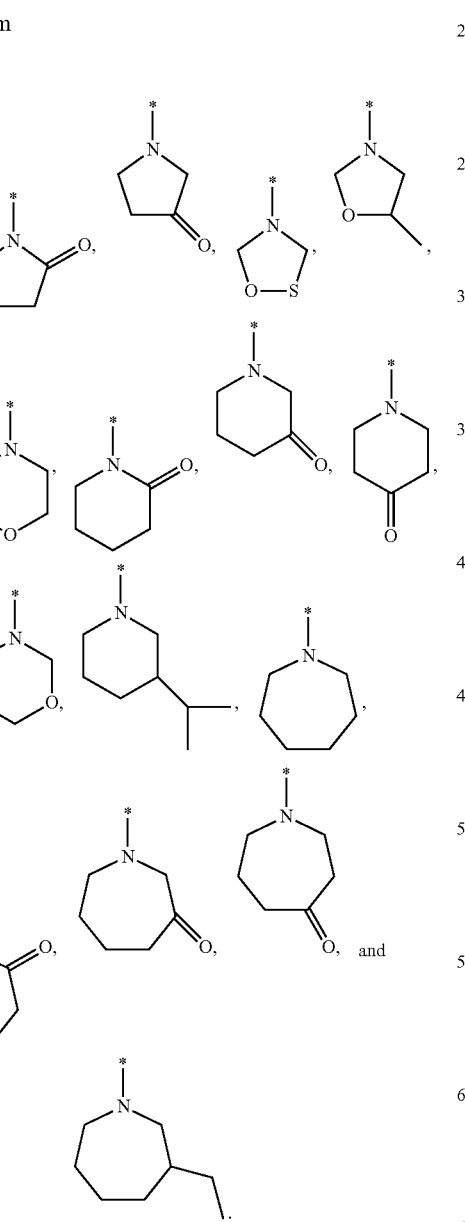

In other illustrative, non-limiting embodiments, the

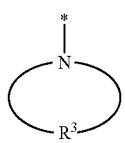

is chosen from

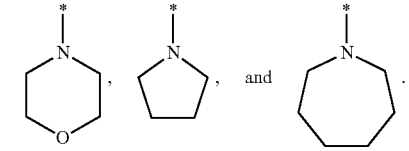

In the copolymers of General Formula (I), $R^2$ is chosen from $Q^1$ and $Q^2$:

$$\text{(Q}^1\text{)}$$

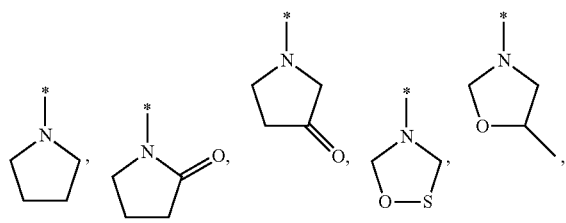

, and $$\text{(Q}^2\text{)}$$

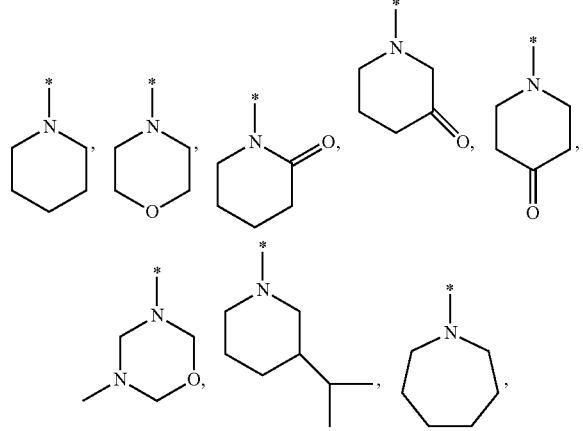

.

In $Q^1$ and $Q^2$, $R^4$ and $R^5$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where the divalent $C_4$-$C_7$ heteroaliphatic groups of $R^4$ and $R^5$ include one or two heteroatoms independently chosen from O, N, and S, and the maximum number of heteroatoms in $R^4$ or $R^5$ is two.

In embodiments where $R^2$ is $Q^1$, $R^4$ is chosen from divalent $C_4$-$C_7$ linear aliphatic groups, divalent $C_4$-$C_7$ branched aliphatic groups, divalent $C_4$-$C_7$ linear heteroaliphatic groups, and divalent $C_4$-$C_7$ branched heteroaliphatic groups. In embodiments, $R^4$ is chosen from divalent $C_4$-$C_6$ linear aliphatic groups and divalent $C_4$-$C_6$ linear heteroaliphatic groups. In other embodiments, $R^4$ is chosen from divalent $C_4$-$C_6$ linear aliphatic groups. In illustrative, non-limiting embodiments, $R^4$ is chosen from —(CH$_2$)$_4$—, —(CH$_2$)$_5$—, and —(CH$_2$)$_6$—.

In one or more embodiments where $R^2$ is $Q^1$, $R^4$ is optionally substituted with one or more substituting groups. In embodiments where $R^4$ is substituted with one or more substituting groups, $R^4$ may include from 1 to 3 substituting groups. In embodiments where $R^4$ is chosen from divalent $C_4$-$C_7$ aliphatic groups and divalent $C_4$-$C_7$ heteroaliphatic groups and is substituted with one or more substituting groups, the divalent $C_4$-$C_7$ aliphatic groups and the divalent $C_4$-$C_7$ heteroaliphatic groups include additional unsatisfied valences "-" within the divalent $C_4$-$C_7$ aliphatic groups and the divalent $C_4$-$C_7$ heteroaliphatic groups to accommodate bonding with the substituting groups. For example, in embodiments where $R^4$ is chosen from divalent $C_4$-$C_7$ aliphatic groups and divalent $C_4$-$C_7$ heteroaliphatic groups and is substituted, additional hydrogen atoms may have been removed from the hydrocarbon groups present within the divalent $C_4$-$C_7$ aliphatic groups and the divalent $C_4$-$C_7$ heteroaliphatic groups to accommodate bonding with the substituting groups.

In embodiments where $R^2$ is $Q^1$, $R^4$ is optionally substituted with one or more $C_1$-$C_6$ aliphatic groups, heteroatoms independently chosen from O, N, and S, or combination thereof. In embodiments, $R^4$ is optionally substituted with one or more $C_1$-$C_6$ linear aliphatic groups, $C_1$-$C_6$ branched aliphatic groups, heteroatoms independently chosen from O, N, and S, or combination thereof. In embodiments, $R^4$ is substituted with one or more $C_1$-$C_6$ linear aliphatic groups, $C_1$-$C_6$ branched aliphatic groups, or combination thereof. In illustrative, non-limiting embodiments, $R^4$ is substituted with one or more lower alkyls. In other illustrative, non-limiting embodiments, $R^4$ is substituted with one or more $C_1$-$C_3$ linear aliphatic groups, $C_1$-$C_3$ branched aliphatic groups, or combination thereof. In still other illustrative, non-limiting embodiments, $R^4$ is substituted with one or more substituting groups independently chosen from methyl, ethyl, n-propyl, isopropyl, allyl moieties, or combinations thereof.

In other embodiments where $R^2$ is $Q^1$, $R^4$ is substituted with one or more heteroatoms independently chosen from O, N, and S. In embodiments where $R^4$ is substituted with one or more heteroatoms independently chosen from O, N, and S, the heteroatoms may form a single bond or a double bond with $R^4$. In illustrative, non-limiting embodiments, $R^4$ is substituted with one heteroatom chosen from O, N, and S. In other illustrative, non-limiting embodiments, $R^4$ is substituted with one heteroatom, where the one heteroatom is O.

In embodiments where $R^4$ is chosen from divalent $C_4$-$C_7$ aliphatic groups and divalent $C_4$-$C_7$ heteroaliphatic groups, the $C_4$-$C_7$ aliphatic groups and the $C_4$-$C_7$ heteroaliphatic groups include an unsatisfied valence "-" at two ends. In this way, $R^4$ forms a heterocycloalkyl or a heterocycle when bonded with the —N— in the rest of the copolymer molecule via its two unsatisfied end valences. In embodiments, the heterocycloalkyl or heterocycle formed when $R^4$ is bonded with the —N— in the rest of the copolymer is non-aromatic. In illustrative, non-limiting embodiments, the heterocycloalkyl or heterocycle formed is chosen from pyrollidinyl, pyrazolidinyl, imidazolidinyl, piperidinyl, piperazinyl, morpholinyl, thiazolidinyl, and azepanyl. In further illustrative, non-limiting embodiments, the heterocycloalkyl, or heterocycle formed is chosen from pyrrolidinyl, piperidinyl, morpholinyl, and azepanyl.

In embodiments, the heterocycloalkyl or heterocycle formed when $R^4$ is bonded with the —N— in the rest of the copolymer molecule has the following structure:

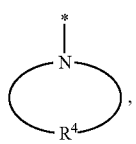

where the heterocycloalkyl or heterocycle is attached to the rest of the copolymer molecule via*. In embodiments, the

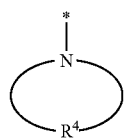

is substituted. In illustrative, non-limiting embodiments, the

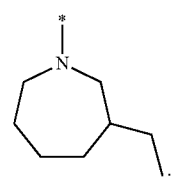

is chosen from

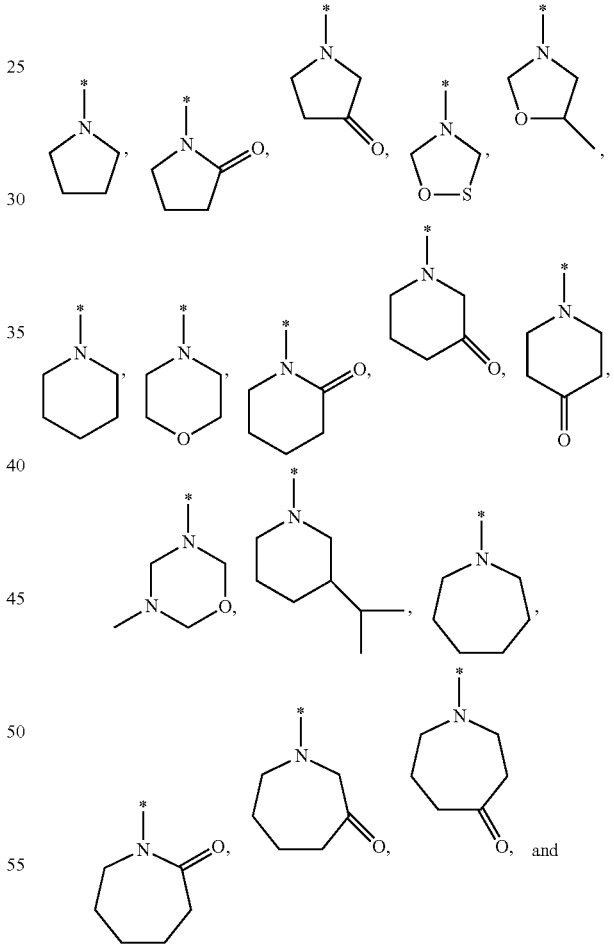

.

In other illustrative, non-limiting embodiments, the

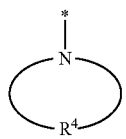

is chosen from

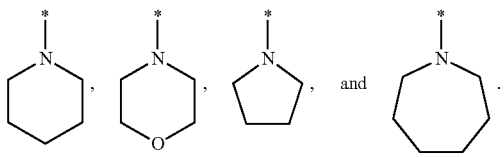

In embodiments where $R^2$ is $Q^2$, $R^5$ is chosen from divalent $C_4$-$C_7$ linear aliphatic groups, divalent $C_4$-$C_7$ branched aliphatic groups, divalent $C_4$-$C_7$ linear heteroaliphatic groups, and divalent $C_4$-$C_7$ branched heteroaliphatic groups. In embodiments, $R^5$ is chosen from divalent $C_4$-$C_6$ linear aliphatic groups and divalent $C_4$-$C_6$ linear heteroaliphatic groups. In other embodiments, $R^5$ is chosen from divalent $C_4$-$C_6$ linear aliphatic groups. In illustrative, non-limiting embodiments, $R^5$ is chosen from —$(CH_2)_6$— substituted with an O heteroatom.

In one or more embodiments where $R^2$ is $Q^2$, $R^5$ is optionally substituted with one or more substituting groups. In embodiments where $R^5$ is substituted with one or more substituting groups, $R^5$ may include from 1 to 3 substituting groups. In embodiments where $R^5$ is chosen from divalent $C_4$-$C_7$ aliphatic groups and divalent $C_4$-$C_7$ heteroaliphatic groups and is substituted with one or more substituting groups, the divalent $C_4$-$C_7$ aliphatic groups and the divalent $C_4$-$C_7$ heteroaliphatic groups include additional unsatisfied valences "-" within the divalent $C_4$-$C_7$ aliphatic groups and the divalent $C_4$-$C_7$ heteroaliphatic groups to accommodate bonding with the substituting groups. For example, in embodiments where $R^5$ is chosen from divalent $C_4$-$C_7$ aliphatic groups and divalent $C_4$-$C_7$ heteroaliphatic groups and is substituted, additional hydrogen atoms may have been removed from the hydrocarbon groups present within the divalent $C_4$-$C_7$ aliphatic groups and the divalent $C_4$-$C_7$ heteroaliphatic groups to accommodate bonding with the substituting groups.

In embodiments where $R^2$ is $Q^2$, $R^5$ is optionally substituted with one or more $C_1$-$C_6$ aliphatic groups, heteroatoms independently chosen from O, N, and S, or combination thereof. In embodiments, $R^5$ is optionally substituted with one or more $C_1$-$C_6$ linear aliphatic groups, $C_1$-$C_6$ branched aliphatic groups, heteroatoms independently chosen from O, N, and S, or combination thereof. In embodiments, $R^5$ is substituted with one or more $C_1$-$C_6$ linear aliphatic groups, $C_1$-$C_6$ branched aliphatic groups, or combination thereof. In illustrative, non-limiting embodiments, $R^5$ is substituted with one or more lower alkyls. In other illustrative, non-limiting embodiments, $R^5$ is substituted with one or more $C_1$-$C_3$ linear aliphatic groups, $C_1$-$C_3$ branched aliphatic groups, or combination thereof. In still other illustrative, non-limiting embodiments, $R^5$ is substituted with one or more substituting groups independently chosen from methyl, ethyl, n-propyl, isopropyl, allyl moieties, or combinations thereof.

In other embodiments where $R^2$ is $Q^2$, $R^5$ is substituted with one or more heteroatoms independently chosen from O, N, and S. In embodiments where $R^5$ is substituted with one or more heteroatoms independently chosen from O, N, and S, the heteroatoms may form a single bond or a double bond with $R^5$. In illustrative, non-limiting embodiments, $R^5$ is substituted with one heteroatom chosen from O, N, and S. In other illustrative, non-limiting embodiments, $R^5$ is substituted with one heteroatom, where the one heteroatom is O.

In embodiments where $R^5$ is chosen from divalent $C_4$-$C_7$ aliphatic groups and divalent $C_4$-$C_7$ heteroaliphatic groups, the $C_4$-$C_7$ aliphatic groups and the $C_4$-$C_7$ heteroaliphatic groups include an unsatisfied valence "-" at two ends. In this way, $R^5$ forms a heterocycloalkyl or a heterocycle when bonded with the —N— in the rest of the copolymer molecule via its two unsatisfied end valences. In embodiments, the heterocycloalkyl or heterocycle formed when $R^5$ is bonded with the —N— in the rest of the copolymer is non-aromatic. In illustrative, non-limiting embodiments, the heterocycloalkyl or heterocycle formed is chosen from pyrollidinyl, pyrazolidinyl, imidazolidinyl, piperidinyl, piperazinyl, morpholinyl, thiazolidinyl, and azepanyl. In further illustrative, non-limiting embodiments, the heterocycloalkyl, or heterocycle formed is chosen from pyrrolidinyl, piperidinyl, morpholinyl, and azepanyl.

In embodiments, the heterocycloalkyl or heterocycle formed when $R^5$ is bonded with the —N— in the rest of the copolymer molecule has the following structure:

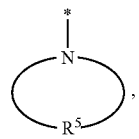

where the heterocycloalkyl or heterocycle is attached to the rest of the copolymer molecule via*. In embodiments, the

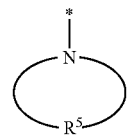

is substituted. In illustrative, non-limiting embodiments, the

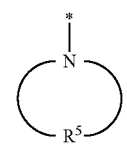

is chosen from

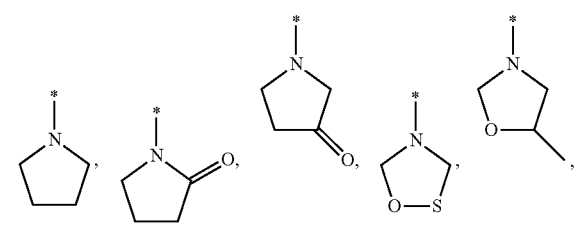

-continued

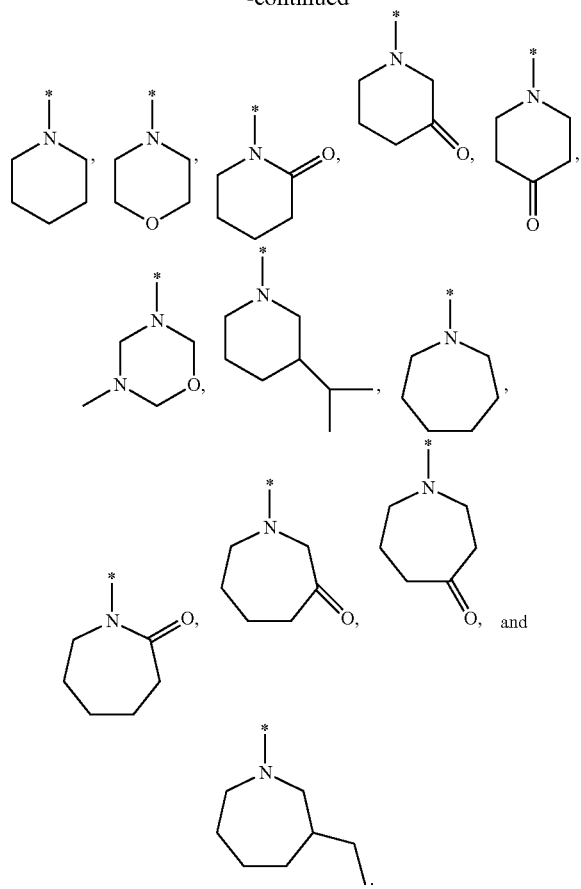

In other illustrative, non-limiting embodiments, the

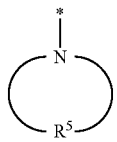

is chosen from

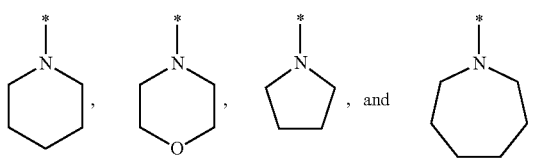

In the copolymers of General Formula (I) x is a molar fraction range chosen from about 0.1 to about 0.9; y is a molar fraction range chosen from about 0.1 to about 0.9; and z is a molar fraction range chosen from 0 to about 0.8. In embodiments, x is a molar fraction range chosen from about 0.1 to about 0.9, from about 0.25 to about 0.75, or from about 0.33 to about 0.66, or a molar fraction of about 0.5. In illustrative, non-limiting embodiments, x is a molar fraction of greater than 0. In embodiments, y is a molar fraction range chosen from about 0.1 to about 0.9, or from about 0.25 to about 0.75, or from about 0.33 to about 0.66, or a molar fraction of about 0.5. In illustrative, non-limiting embodiments, y is a molar fraction of greater than 0. In embodiments, z is a molar fraction range chosen from 0 to about 0.8, or from about 0.25 to about 0.5, or a molar fraction of about 0.33. In embodiments, z is a molar fraction of greater than 0. In the copolymers of General Formula (I), the summation of x, y and z equals 1. In embodiments, x and y are equimolar fractions. In other embodiments, x, y, and z are equimolar fractions.

In embodiments, the viscosity average molecular weight of the copolymers of General Formula (I) is from about 500 grams/mole (that is g/mol) to about 1,000,000 g/mol, or from about 750 g/mol to about 500,000 g/mol, or from about 1,000 g/mol to about 100,000 g/mol, or from about 2,500 g/mol to about 20,000 g/mol. In embodiments, the viscosity average molecular weight of the copolymers was determined via gel permeation chromatography (that is, GPC), employing 0.7% trimethylamine in tetrahydrofuran (that is, THF) as a mobile phase, Phenogel™ (Phenomenex, Sutter Creek, Calif.) as stationary phases (of differing pore sizes, 500 Å, 100 Å, and 50 Å) in three columns in series, with a refractive index detector (that is, RID). Calibration was performed using polystyrene standards. Moreover, the viscosity average molecular weight of the copolymers of General Formula (I) as determined by GPC was confirmed via sulfur elemental analysis.

In illustrative, non-limiting embodiments, the viscosity average molecular weight of the copolymers of General Formula (I) is from about 500 g/mol to about 1,000,000 g/mol. In alternative illustrative, non-limiting embodiments, the viscosity average molecular weight of the copolymers of General Formula (I) is from about 500 g/mol to about 20,000 g/mol.

In illustrative, non-limiting embodiments, $R^4$ and $R^5$ are each independently chosen from divalent $C_4$-$C_6$ linear aliphatic groups, and $R^4$ and $R^5$ are substituted with one or more $C_1$-$C_3$ aliphatic groups. In other illustrative, non-limiting embodiments, $R^2$ is $Q^1$, and $R^4$ is chosen from divalent $C_4$-$C_6$ linear aliphatic groups and divalent $C_4$-$C_6$ linear heteroaliphatic groups. In still other illustrative, non-limiting embodiments, $R^2$ is $Q^2$, and $R^5$ is chosen from divalent $C_4$-$C_6$ linear aliphatic groups and divalent $C_4$-$C_6$ linear heteroaliphatic groups. In illustrative, non-limiting embodiments, $R^2$ is $Q^1$, and $R^4$ is chosen from divalent $C_4$-$C_6$ linear aliphatic groups. In other illustrative, non-limiting embodiments, $R^2$ is $Q^2$, and $R^5$ is chosen from divalent $C_4$-$C_6$ linear aliphatic groups. In still other illustrative, non-limiting embodiments, $R^2$ is $Q^2$, $R^5$ is chosen from divalent $C_4$-$C_6$ linear aliphatic groups and divalent $C_4$-$C_6$ linear heteroaliphatic groups, and $R^5$ is substituted with one heteroatom independently chosen from O, N, and S.

In illustrative, non-limiting embodiments, $R^1$ is chosen from divalent $C_4$-$C_6$ linear aliphatic groups and divalent $C_4$-$C_6$ linear heteroaliphatic groups, $R^3$ is chosen from divalent $C_4$-$C_6$ linear aliphatic groups and divalent $C_4$-$C_6$ linear heteroaliphatic groups, $R^4$ and $R^5$ are each independently chosen from divalent $C_4$-$C_6$ linear aliphatic groups and divalent $C_4$-$C_6$ linear heteroaliphatic groups, x is a molar fraction range of from about 0.25 to about 0.75, is a molar fraction range of from about 0.25 to about 0.75, and z is a molar fraction range of from about 0.25 to about 0.5. In other illustrative, non-limiting embodiments, x is a molar fraction range of from about 0.25 to about 0.75, y is a molar fraction range of from about 0.25 to about 0.75, and z is a molar fraction range of from about 0.25 to about 0.5.

In Table 1, copolymers having General Formula (I) according to various embodiments are provided:

TABLE 1

Copolymers of General Formula (I)

| Reference | Copolymer of General Formula (I) | Name |
|---|---|---|
| ABB-1 | [structure: morpholine 0.5n / pyrrolidine 0.5n] | Bipolymer of Poly(N-acryloylmorpholine) and Poly(N-acryloylpyrrolidine) |
| ABB-2 | [structure: morpholine 0.75n / homopiperidine 0.25n] | Bipolymer of Poly(N-acryloylmorpholine) and Poly(N-acryloylhomopiperidine) |
| ABB-3 | [structure: morpholine 0.80n / homopiperidine 0.20n] | Bipolymer of Poly(N-acryloylmorpholine) and Poly(N-acryloylhomopiperidine) |
| ABB-4 | [structure: morpholine 0.25n / homopiperidine 0.75n] | Bipolymer of Poly(N-acryloylmorpholine) and Poly(N-acryloylhomopiperidine) |
| ABB-5 | [structure: morpholine 0.75n / vinylcaprolactam 0.25n] | Bipolymer of Poly(N-acryloylmorpholine) and Polyvinylcaprolactam |
| ABB-6 | [structure: morpholine 0.5n / vinylcaprolactam 0.5n] | Bipolymer of Poly(N-acryloylmorpholine) and Polyvinylcaprolactam |
| ABB-7 | [structure: morpholine 0.25n / vinylcaprolactam 0.75n] | Bipolymer of Poly(N-acryloylmorpholine) and Polyvinylcaprolactam |
| ABB-8 | [structure: pyrrolidine 0.25n / vinylcaprolactam 0.75n] | Bipolymer of Poly(N-acryloylmorpholine) and Polyvinylcaprolactam |

TABLE 1-continued

Copolymers of General Formula (I)

| Reference | Copolymer of General Formula (I) | Name |
|---|---|---|
| ABB-9 | | Bipolymer of Poly(N-acryloylpiperidine) and Poly(N-acryloylpyrrolidine) |
| ABT-10 | | Terpolymer of Poly(N-acryloylmorpholine), Poly(N-acryloylpiperidine), and Poly(N-acryloylpyrrolidine) |
| ABB-15 | | Bipolymer of Poly(N-acryloylmorpholine) and Poly(N-acryloylpiperidine) |

In embodiments, the at least one copolymer of General Formula (I) is water soluble. In further embodiments, the at least one copolymer of General Formula (I) is thermally stable. In illustrative, non-limiting embodiments, the at least one copolymer of General Formula (I) is thermally stable up to a temperature of about 50° C.

Embodiments of acryloyl-based copolymers having General Formula (I) have been described in detail. Embodiments of methods for synthesizing the copolymers of General Formula (I) will be described.

II Methods for Synthesizing the Copolymers of General Formula (I)

In one or more embodiments, the disclosure describes methods for synthesizing the copolymers of General Formula (I). However, the copolymers of General Formula (I) may be synthesized via any suitable synthetic scheme known to a person of ordinary skill in the art. In illustrative, non-limiting embodiments where $R^2$ is $Q^1$ in General Formula (I), the methods for synthesizing the copolymers of General Formula (I) include providing 4,4-Azobis(4-cyanovaleric acid) (that is, ABCVA) (about 1.25 millimole, that is mmol) with a solution having monomeric repeating units having formula (1a) (about 24 mmol), (1b) (about 24 mmol), and (1c) (about 18 mmol):

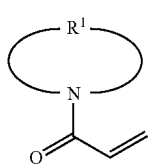 (1a)

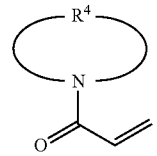 (1b)

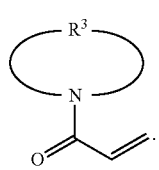 (1c)

and thioglycolic acid (about 10.8 mmol) in water (about 42 milliliters, that is mL) under $N_2$ to form a reaction mixture. In embodiments, the reaction mixture is stirred under $N_2$ at about 63° C. using a magnetic stir-bar for 24 hours to obtain a reaction product including a synthesized acryloyl-based terpolymer. After 24 hours, in embodiments, the reaction product is cooled to room temperature, washed with petroleum ether (about 3×20 mL), and freeze-dried.

In other illustrative, non-limiting embodiments where $R^2$ is $Q^2$ in General Formula (I), the methods for synthesizing the copolymers of General Formula (I) include providing ABCVA (about 1.25 mmol) with a solution having monomeric repeating units having formula (1a) (about 24 mmol), (1d) (about 24 mmol), and (1c) (about 18 mmol):

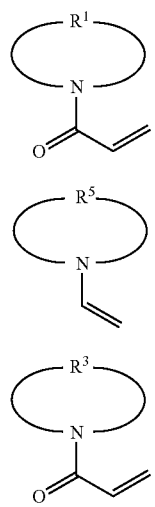

(1a)

(1d)

(1c)

and thioglycolic acid (about 10.8 mmol) in water (about 42 mL) under $N_2$ to form a reaction mixture. In embodiments, the reaction mixture is stirred under $N_2$ at about 63° C. using a magnetic stir-bar for 24 hours to obtain a reaction product including a synthesized acryloyl-based terpolymer. After 24 hours, in embodiments, the reaction product is homogenous, cooled to room temperature, washed with petroleum ether (about 3×20 mL), and freeze-dried.

In embodiments, $R^1$, $R^2$, $R^3$, $R^4$, and $R^5$ of General Formula (I) or of monomeric repeating units having formula (1a), (1b), (1c), and (1d) are as described previously with regard to General Formula (I). As will be appreciated by one of ordinary skill in the art, quantities of reactants, for example, monomeric repeating units (1a), (1b), (1c), and (1d) in the solution may be adjusted to achieve varying molar fractions x, y, or z, of each monomeric repeating unit. Further, as will also be appreciated by one of ordinary skill in the art, bipolymers and terpolymers may be synthesized via the methods described in this disclosure by adding only the monomeric repeating units (1a), (1b), (1c), and (1d) which are desired in the copolymers of General Formula (I).

Embodiments of methods for synthesized the copolymers of General Formula (I) have now been described in detail. Embodiments of methods for inhibiting formation of clathrate hydrates will now be described in detail with reference to FIG. 1.

III. Methods for Inhibiting Formation of Clathrate Hydrates

In one or more embodiments, the disclosure describes methods for inhibiting clathrate hydrates in a fluid capable of forming the clathrate hydrates, the methods including contacting the fluid with at least one copolymer of General Formula (I) under conditions suitable for forming clathrate hydrates. In further embodiments, the at least one copolymer of General Formula (I) is as described previously.

In the copolymers of General Formula (I), $R^1$ and $R^3$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where the divalent $C_4$-$C_7$ heteroaliphatic groups of $R^1$ and $R^3$ include one or two heteroatoms independently chosen from O, N, and S, and the maximum number of heteroatoms in $R^1$ or $R^3$ is two. Additionally, in the copolymers of General Formula (I), $R^2$ is chosen from $Q^1$ and $Q^2$:

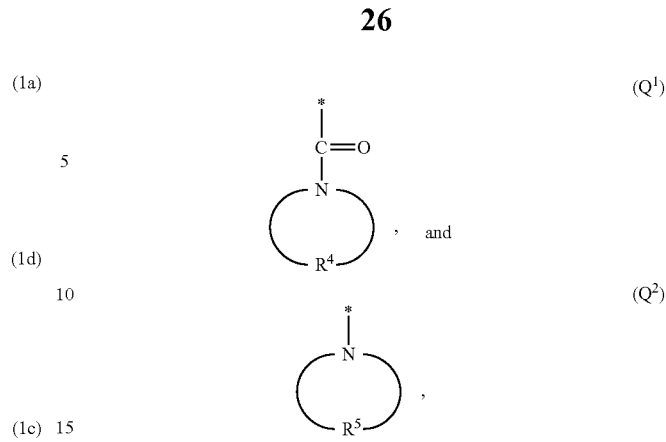

in which: $R^4$ and $R^5$ are each independently chosen from divalent $C_4$-$C_7$ aliphatic groups and divalent $C_4$-$C_7$ heteroaliphatic groups, optionally substituted with one or more $C_1$-$C_6$ aliphatic groups, heteroatoms independently chosen from O, N, and S, or combination thereof, where: the divalent $C_4$-$C_7$ heteroaliphatic groups of $R^4$ and $R^5$ include one or two heteroatoms independently chosen from O, N, and S, and the maximum number of heteroatoms in $R^4$ or $R^5$ is two. Also in the copolymers of General Formula (I), x is a molar fraction range chosen from about 0.1 to about 0.9; y is a molar fraction range chosen from about 0.1 to about 0.9; and z is a molar fraction range chosen from 0 to about 0.8, where the summation of x, y, and z equals 1.

In illustrative, non-limiting embodiments, in the at least one copolymer of General Formula (I), $R^1$ is chosen from divalent linear $C_4$-$C_6$ aliphatic groups and divalent linear $C_4$-$C_6$ heteroaliphatic groups, $R^2$ is $Q^2$, and $R^5$ is chosen from divalent $C_4$-$C_6$ linear aliphatic groups and divalent $C_4$-$C_6$ linear heteroaliphatic groups. In other illustrative, non-limiting embodiments, in the at least one copolymer of General Formula (I), $R^1$ is chosen from divalent linear $C_4$-$C_6$ aliphatic groups and divalent linear $C_4$-$C_6$ heteroaliphatic groups, $R^2$ is $Q^1$, and $R^4$ is chosen from divalent $C_4$-$C_5$ linear aliphatic groups and divalent $C_4$-$C_5$ linear heteroaliphatic groups. In still other illustrative, non-limiting embodiments, in the at least one copolymer of General Formula (I), $R^1$ is chosen from divalent linear $C_4$-$C_6$ aliphatic groups and divalent linear $C_4$-$C_6$ heteroaliphatic groups, $R^4$ and $R^5$ are each independently chosen from divalent $C_4$-$C_6$ linear aliphatic groups and divalent $C_4$-$C_6$ linear heteroaliphatic groups, x is a molar fraction of about 0.8, and y is a molar fraction of about 0.2.

In illustrative, non-limiting embodiments, in the at least one copolymer of General Formula (I), $R^1$ is chosen from divalent $C_4$-$C_5$ linear aliphatic groups and divalent $C_4$-$C_5$ linear heteroaliphatic groups. In other illustrative, non-limiting embodiments, in the at least one copolymer of General Formula (I), $R^4$ and $R^5$ are each independently chosen from divalent $C_4$-$C_6$ linear aliphatic groups and divalent $C_4$-$C_6$ linear heteroaliphatic groups. In still other illustrative, non-limiting embodiments, in the at least one copolymer of General Formula (I), $R^1$ is chosen from divalent $C_4$-$C_6$ linear aliphatic groups and divalent $C_4$-$C_6$ linear heteroaliphatic groups, $R^3$ is chosen from divalent $C_4$-$C_6$ linear aliphatic groups and divalent $C_4$-$C_6$ linear heteroaliphatic groups, $R^4$ and $R^5$ are each independently chosen from divalent $C_4$-$C_6$ linear aliphatic groups and divalent $C_4$-$C_6$ linear heteroaliphatic groups, x is a molar fraction range of from about 0.25 to about 0.75, y is a molar fraction range of from about 0.25 to about 0.75, and z is a molar fraction greater than 0. In illustrative, non-limiting embodiments, in the at least one copolymer of General Formula (I), x and y are equimolar fractions. In other illustrative, non-limiting embodiments, in the at least one copolymer of General Formula (I), x, y, and z are equimolar fractions. In still other illustrative, non-limiting embodiments, in the at least one copolymer of General Formula (I), the viscosity average molecular weight of the at least one copolymer is in the range of from about 500 g/mol to about 20,000 g/mol.

In embodiments, the fluid is contacted with a formulation including the at least one copolymer of General Formula (I). In embodiments, the fluid is contacted with about 3 weight % of the formulation, where the amount of formulation relates to the percentage of the water cut. More specifically, in embodiments, the formulation includes one or more of the at least one copolymer of General Formula (I) (for example, two or more copolymers of General Formula (I) could be used), solvents, or additives. In embodiments, the at least one copolymer of General Formula (I) is compatible with additives. In embodiments, the additives are chosen from corrosion inhibitors and synergists. In illustrative, non-limiting embodiments, the formulation includes from about 0.01 weight % to about 33 weight % of the at least one copolymer of General Formula (I), from 0 weight % to about 67 weight % of the solvent, and from 0 weight % to about 1 weight % of the additive. In other illustrative, non-limiting embodiments, the formulation includes from about 0.1 weight % to about 5 weight % of the at least one copolymer of General Formula (I), from 0 weight % to about 20 weight % of the solvent, from 0 weight % to about 10 weight % of the additives, from 0 parts per million (that is, ppm; a mass fraction) to about 3000 ppm of the corrosion inhibitors, from 0 ppm to about 3000 ppm of the scale inhibitors, from 0 weight % to about 40 weight % of the thermodynamic hydrate inhibitors, and from about 0 weight % to about 10 weight % of the anti-agglomerates. In embodiments, the amounts disclosed of the formulation relate to the percentage or ppm of the water cut.

In illustrative, non-limiting embodiments, the solvents are chosen from water, alcohols, for example, monoethylene glycol, methanol, ethanol, and isobutanol, ketones, ethers, and non-polar aromatics, for example, toluene and benzene. In further illustrative, non-limiting embodiments, the solvents are alcohols chosen from glycols, for example, monoethylene glycol. In other illustrative, non-limiting embodiments, the additives are chosen from corrosion inhibitors and synergists. In illustrative, non-limiting embodiments, the corrosion inhibitors include gas corrosion inhibitors. In embodiments, the synergists are chosen from scale inhibitors, thermodynamic hydrate inhibitors, low dose hydrate inhibitors, and anti-agglomerates. In illustrative, non-limiting embodiments, the thermodynamic hydrate inhibitors are chosen from glycol ethers and methanol. In illustrative, non-limiting embodiments, low dose hydrate inhibitors are chosen from Poly(N-vinylcaprolactam) and poly(N-methyl-N-vinylacetamide).

In embodiments, the fluid is contacted with at least one copolymer of General Formula (I) under conditions suitable for forming clathrate hydrates. In embodiments, the at least one copolymer of General Formula (I) is contacted with the fluid via methods known to one of ordinary skill in the art. For example, the at least one copolymer of General Formula (I) may be contacted with the fluid via adding, combining, mixing, injecting, or combination thereof. In illustrative, non-limiting embodiments, conditions suitable for forming clathrate hydrates include conditions where the pressure on the fluid is from about 11 bara to about 200 bara, or from about 11 bara to about 50 bara, or from about 50 bara to about 70 bara, or from about 70 bara to about 100 bara, or from about 100 bara to about 140 bara, or from about 140 bara to about 150 bara, or from about 150 bara to about 200 bara, and also includes conditions where the temperature of the fluid is from about 0° C. to about 25° C., or from about 0° C. to about 10° C., or from about 10° C. to about 12° C., or from about 12° C. to about 16° C., or from about 16° C. to about 19° C., or from about 19° C. to about 20° C., or from about 20° C. to about 25° C. In illustrative, non-limiting embodiments, conditions suitable for forming clathrate hydrates include conditions where the temperature of the fluid is equal to or less than the three-phase equilibrium temperature.

In other embodiments, contacting the fluid with at least one copolymer of General Formula (I) under conditions suitable for forming the clathrate hydrates is effective to inhibit or inhibits the formation of the clathrate hydrates at a first subcooling temperature. In other embodiments, contacting the fluid with at least one copolymer of General Formula (I) under conditions suitable for forming the clathrate hydrates is effective to inhibit or inhibits the formation of the clathrate hydrates at a second subcooling temperature. In still other embodiments, contacting the fluid with at least one copolymer of General Formula (I) under conditions suitable for forming the clathrate hydrates is effective to inhibit or inhibits the formation of the clathrate hydrates at a third subcooling temperature.

In illustrative, non-limiting embodiments, contacting the fluid with at least one copolymer of General Formula (I) under conditions suitable for forming the clathrate hydrates is effective to inhibit or inhibits the formation of the clathrate hydrates in a pressure range of from about 40 bars to about 200 bars. In other illustrative, non-limiting embodiments, contacting the fluid with at least one copolymer of General Formula (I) under conditions suitable for forming the clathrate hydrates is effective to inhibit or inhibits the formation of the clathrate hydrates in a pressure range of from about 70 bars to about 100 bars.

In embodiments, the fluid capable of forming clathrate hydrates includes water host molecules and natural gas guest molecules. In further embodiments, the natural gas guest molecules are chosen from methane, ethane, propane, butane, pentane, carbon dioxide, hydrogen sulfide, nitrogen, or combination thereof. In illustrative, non-limiting embodiments, the fluid capable of forming clathrate hydrates includes natural gas guest molecules in the following compositional amounts: methane (from about 60-90 mole %); ethane (from about 0-4 mole %); propane (from about 0-1 mole %); butane (from about 0-1 mole %); carbon dioxide (from about 5-15 mole %); hydrogen sulfide (from about 0-5 mole %); and nitrogen (from about 5-15 mole %). In other illustrative, non-limiting embodiments, the fluid capable of forming clathrate hydrates includes natural gas guest molecules in the following compositional amount: methane (about 79.6 mole %); ethane (about 1.4 mole %); propane (about 0.2 mole %); butane (about 0.1 mole %); carbon dioxide (about 9.2 mole %); hydrogen sulfide (about 2.3 mole %); and nitrogen (about 7.2 mole %). In other embodiments, the fluid capable of forming clathrate hydrates includes brine, such as is described subsequently in Table 2. In illustrative, non-limiting embodiments, the brine includes chloride anions, sodium cations, acetic acid, formic acid, a conjugate base of acetic acid, a conjugate base of formic acid, or combinations thereof.

In illustrative, non-limiting embodiments, the fluid capable of forming clathrate hydrates includes acid gas guest molecules. For example, in embodiments, the fluid capable of forming clathrate hydrates includes carbon dioxide and hydrogen sulfide. In illustrative, non-limiting embodiments, the fluid capable of forming clathrate hydrates is rich in carbon dioxide, hydrogen sulfide, or a combination of carbon dioxide and hydrogen sulfide. For example, the fluid capable of forming clathrate hydrates may be rich in hydrogen sulfide where it includes at least about 2 mole % of hydrogen sulfide. As another example, the fluid capable of forming clathrate hydrates may be rich in carbon dioxide where it includes at least about 8 mole % of carbon dioxide. As yet another example, the fluid capable of forming clathrate hydrates may be rich in both carbon dioxide and hydrogen sulfide where it includes at least about 8 mole % of carbon dioxide and at least about 2 mole % of hydrogen sulfide. In still other illustrative, non-limiting embodiments, the fluid capable of forming clathrate hydrates includes carbon dioxide, hydrogen sulfide, nitrogen, or combination thereof. In yet other illustrative, non-limiting embodiments, the fluid capable of forming clathrate hydrates includes methane, ethane, propane, butane, carbon dioxide, hydrogen sulfide, and nitrogen gas guest molecules. In yet still other illustrative, non-limiting embodiments, the fluid capable of forming clathrate hydrates does not include hydrogen sulfide, carbon dioxide, or a combination of hydrogen sulfide and carbon dioxide.

In embodiments, the fluid capable of forming clathrate hydrates is capable of forming SI clathrate hydrates, SII clathrate hydrates, SH clathrate hydrates, or combination thereof. In embodiments, fluids capable of forming SI clathrate hydrates include at least one of methane, ethane, propane, butane, carbon dioxide, or hydrogen sulfide. In embodiments, fluids capable of forming SII clathrate hydrates include at least one of propane, butane, or pentane. In embodiments, SI clathrate hydrates and SII clathrate hydrates have crystalline cubic structures which are well known to one of ordinary skill in the art. In embodiments, SH clathrate hydrates have hexagonal structures which are well known to one of ordinary skill in the art. In further embodiments where the fluid capable of forming clathrate hydrates is capable of forming SI clathrate hydrates, SII clathrate hydrates, SH clathrate hydrates, or combinations thereof, the contacting is effective to inhibit or inhibits formation of SI clathrate hydrates, SII clathrate hydrates, SH clathrate hydrates, or combinations thereof.

In embodiments, the fluid is contacted with the at least one copolymer of General Formula (I) in an amount effective to inhibit clathrate hydrate formation. In specific embodiments, the fluid is contacted with from about 0.01 weight % to about 33 weight %, or from about 0.1 weight % to about 4 weight %, or from about 0.5 weight % to about 4 weight %, or about 2.5 weight % of the at least one copolymer of General Formula I. In embodiments, the weight % of the at least one copolymer of General Formula I refers to the weight % of the water cut. In embodiments, the at least one copolymer of General Formula (I) is water soluble.

As shown in FIG. 1, in embodiments, the fluid capable of forming the clathrate hydrates is contacted with the at least one copolymer of General Formula (I) at a tie-in-platform 10. As shown in FIG. 1, in embodiments, the tie-in-platform 10 is an offshore platform which is in fluidic communication with an onshore plant 100 via a pipeline 50. In embodiments, the tie-in-platform 10 is in fluidic communication with wellheads 200, 300, 400, 500, and 600, which provide an interface for drilling and production equipment. In embodiments, the fluid capable of forming the clathrate hydrates is flowing in pipeline 50. In further embodiments, the fluid capable of forming the clathrate hydrates is flowing in pipeline 50 from an offshore site to an onshore site. In illustrative, non-limiting embodiments, the fluid capable of forming the clathrate hydrates is flowing in the pipeline 50 from the tie-in-platform 10 to the onshore plant 100. In illustrative, non-limiting embodiments, the at least one copolymer of General Formula (I) is injected into the fluid capable of forming the clathrate hydrates at the tie-in-platform 10.

In embodiments, the tie-in-platform 10 includes a receptacle 15 for holding clathrate hydrate inhibitors and a clathrate hydrate inhibitor injection skid 20. In illustrative, non-limiting embodiments, the at least one copolymer of General Formula (I) is held in the receptacle 15 for holding clathrate hydrate inhibitors. In illustrative, non-limiting embodiments, the at least one copolymer of General Formula (I) is injected into the fluid capable of forming the clathrate hydrates via the clathrate hydrate inhibitor injection skid 20.

Embodiments of methods for inhibiting formation of clathrate hydrates using the acryloyl-based copolymers having General Formula (I) have been described in detail.

EXAMPLES

The following non-limiting examples illustrate the synthesis of the copolymers having General Formula (I) and of comparative homopolymers, and also illustrate methods of the present disclosure. The compounds synthesized should be understood to be illustrative in nature and in no regard limiting to the scope of General Formula (I) or of the methods described.

Example 1: Synthesis of Acryloyl-Based Bipolymers Having General Formula (I) in Water Materials and Methods.

Acryloyl-based bipolymers (that is, ABB) having General Formula (I) in which $R^1$ is —$(CH_2)_2$—O—$(CH_2)_2$—, $R^2$ is $Q^1$ in which $R^4$ is —$(CH_2)_4$—, $R^3$ is not present, x is about 0.5, y is about 0.5, and z is 0, were synthesized. Specifically, acryloyl-based bipolymers having General Formula (I) were synthesized by adding ABCVA (about 350 milligrams, that is mg, 1.25 mmol) to a solution having a monomeric repeating unit of structure (M1) (about 36.3 mmol):

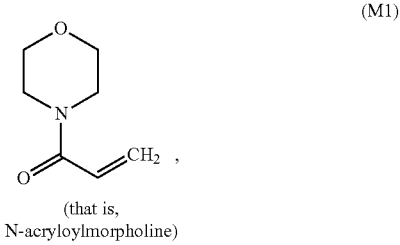

(that is, N-acryloylmorpholine)

a monomeric repeating unit of structure (M2) (about 36.3 mmol):

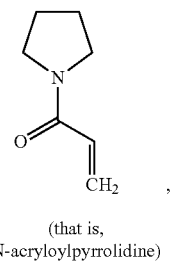

(M2)

(that is,
N-acryloylpyrrolidine)

and thioglycolic acid (about 995 mg, 10.8 mmol) in water (about 42 mL) to form a reaction mixture. The reaction mixture was heated under $N_2$ at about 63° C. for 24 hours. After 24 hours, the reaction mixture was cooled to room temperature. The reaction mixture was washed with petroleum ether (about 3×20 mL) and freeze-dried to obtain an acryloyl-based bipolymer of structure (ABB-1):

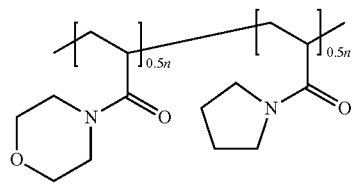

(ABB-1)

as a white product (Yield: about 87%).

Example 2: Synthesis of Acryloyl-Based Bipolymers Having General Formula (I) in Water Materials and Methods.

Acryloyl-based bipolymers having General Formula (I) in which $R^1$ is —$(CH_2)_2$—O—$(CH_2)_2$—, $R^2$ is $Q^1$ in which $R^4$ is —$(CH_2)_6$—, $R^3$ is not present, x is about 0.75, y is about 0.25, and z is 0, were synthesized as in Example 1 except as indicated otherwise. More specifically, acryloyl-based bipolymers having General Formula (I) were synthesized by adding ABCVA (about 350 mg, 1.25 mmol) to a solution having a monomeric repeating unit of structure (M1) (about 54.45 mmol):

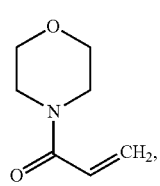

(M1)

a monomeric repeating unit of structure (M3) (about 18.15 mmol):

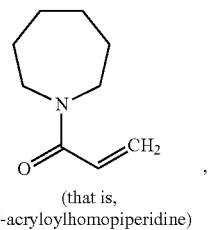

(M3)

(that is,
N-acryloylhomopiperidine)

and thioglycolic acid (about 995 mg, 10.8 mmol) in water (about 42 mL) to form a reaction mixture. The reaction mixture was heated under $N_2$ at about 63° C. for 24 hours. After 24 hours, the reaction mixture was cooled to room temperature. The reaction mixture was washed with petroleum ether (about 3×20 mL) and freeze-dried to obtain an acryloyl-based bipolymer of structure (ABB-2):

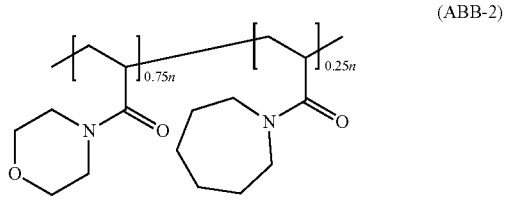

(ABB-2)

as a white product (Yield: about 95%).

Example 3: Synthesis of Acryloyl-Based Bipolymers Having General Formula (I) in Water Materials and Methods.

Acryloyl-based bipolymers having General Formula (I) in which $R^1$ is —$(CH_2)_2$—O—$(CH_2)_2$—, $R^2$ is $Q^1$ in which $R^4$ is —$(CH_2)_6$—, $R^3$ is not present, x is about 0.80, y is about 0.20, and z is 0, were synthesized as in Example 2 except as indicated otherwise. More specifically, acryloyl-based bipolymers having General Formula (I) were synthesized by adding ABCVA (about 350 mg, 1.25 mmol) to a solution having a monomeric repeating unit of structure (M1) (about 58.08 mmol):

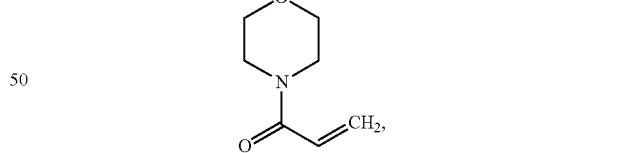

(M1)

a monomeric repeating unit of structure (M3) (about 14.52 mmol):

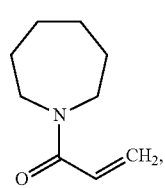

(M3)

and thioglycolic acid (about 995 mg, 10.8 mmol) in water (about 42 mL) to form a reaction mixture. The reaction mixture was heated under N$_2$ at about 63° C. for 24 hours. After 24 hours, the reaction mixture was cooled to room temperature. The reaction mixture was washed with petroleum ether (about 3×20 mL) and freeze-dried to obtain an acryloyl-based bipolymer of structure (ABB-3):

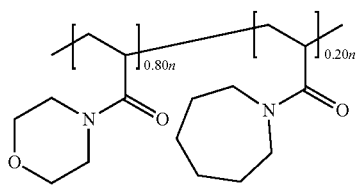
(ABB-3)

as a white product Yield: about 85%).

Example 4: Synthesis of Acryloyl-Based Bipolymers Having General Formula (I) in Water Materials and Methods.

Acryloyl-based bipolymers having General Formula (I) in which R$^1$ is —(CH$_2$)$_2$—O—(CH$_2$)$_2$—, R$^2$ is Q$^1$ in which R$^4$ is —(CH$_2$)$_6$—, R$^3$ is not present, x is about 0.25, y is about 0.75, and z is 0, were synthesized as in Example 2 except as indicated otherwise. More specifically, acryloyl-based bipolymers having General Formula (I) were synthesized by adding ABCVA (about 350 mg, 1.25 mmol) to a solution having a monomeric repeating unit of structure (M1) (about 18.15 mmol):

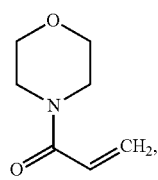
(M1)

a monomeric repeating unit of structure (M3) (about 54.45 mmol):

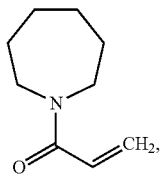
(M3)

and thioglycolic acid (about 995 mg, 10.8 mmol) in water (about 42 mL) to form a reaction mixture. The reaction mixture was heated under N$_2$ at about 63° C. for 24 hours. After 24 hours, the reaction mixture was cooled to room temperature. The reaction mixture was washed with petroleum ether (about 3×20 mL) and freeze-dried to obtain an acryloyl-based bipolymer of structure (ABB-4):

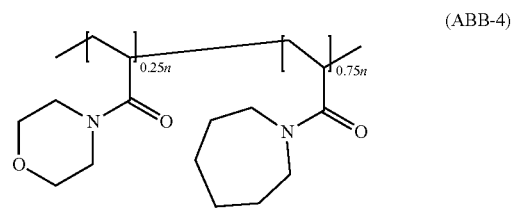
(ABB-4)

as a white product (Yield: 87%).

Example 5: Synthesis of Acryloyl-Based Bipolymers Having General Formula (I) in Water Materials and Methods.

Acryloyl-based bipolymers having General Formula (I) in which R$^1$ is —(CH$_2$)$_2$—O—(CH$_2$)$_2$—, R$^2$ is Q$^2$ in which R$^5$ is —(CH$_2$)$_6$— substituted with O, R$^3$ is not present, x is about 0.75, y is about 0.25, and z is 0, were synthesized as in Example 1 except as indicated otherwise. More specifically, acryloyl-based bipolymers having General Formula (I) were synthesized by adding ABCVA (about 350 mg, 1.25 mmol) to a solution having a monomeric repeating unit of structure (M1) (about 54.45 mmol):

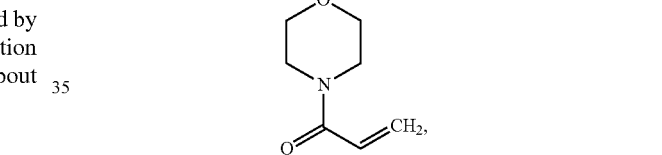
(M1)

a monomeric repeating unit of structure (M4) (about 18.15 mmol):

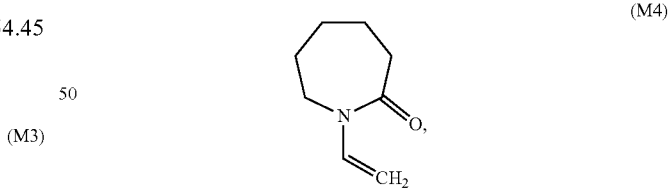
(M4)

(that is, N-vinylcaprolactam)

and thioglycolic acid (about 995 mg, 10.8 mmol) in water (about 42 mL) to form a reaction mixture. The reaction mixture was heated under N$_2$ at about 63° C. for 24 hours. After 24 hours, the reaction mixture was cooled to room temperature. The reaction mixture was washed with petroleum ether (about 3×20 mL) and freeze-dried to obtain an acryloyl-based bipolymer of structure (ABB-5):

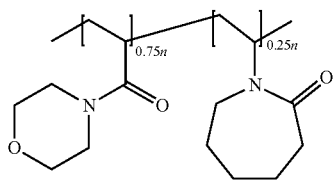

(ABB-5)

as a white product (Yield: about 93%).

Example 6: Synthesis of Acryloyl-Based
Bipolymers Having General Formula (I) in Water Materials and Methods.

Acryloyl-based bipolymers having General Formula (I) in which $R^1$ is —$(CH_2)_2$—O—$(CH_2)_2$—, $R^2$ is $Q^2$ in which $R^5$ is —$(CH_2)_6$— substituted with O, $R^3$ is not present, x is about 0.5, y is about 0.5, and z is 0, were synthesized as in Example 5 except as indicated otherwise. More specifically, acryloyl-based bipolymers having General Formula (I) were synthesized by adding ABCVA (about 350 mg, 1.25 mmol) to a solution having a monomeric repeating unit of structure (M1) (about 36.3 mmol):

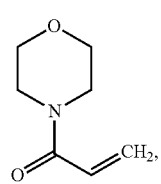

(M1)

a monomeric repeating unit of structure (M4) (about 36.3 mmol):

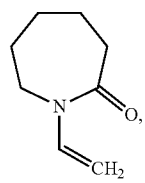

(M4)

and thioglycolic acid (about 995 mg, 10.8 mmol) in water (about 42 mL) to form a reaction mixture. The reaction mixture was heated under $N_2$ at about 63° C. for 24 hours. After 24 hours, the reaction mixture was cooled to room temperature. The reaction mixture was washed with petroleum ether (about 3×20 mL) and freeze-dried to obtain an acryloyl-based bipolymer of structure (ABB-6):

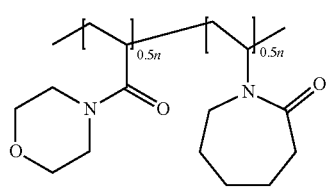

(ABB-6)

as a white product Yield: about 95%).

Example 7: Synthesis of Acryloyl-Based
Bipolymers Having General Formula (I) in Water Materials and Methods.

Acryloyl-based bipolymers having General Formula (I) in which $R^1$ is —$(CH_2)_2$—O—$(CH_2)_2$—, $R^2$ is $Q^2$ in which $R^5$ is —$(CH_2)_6$— substituted with O, $R^3$ is not present, x is about 0.25, y is about 0.75, and z is 0, were synthesized as in Example 5 except as indicated otherwise. More specifically, acryloyl-based bipolymers having General Formula (I) were synthesized by adding ABCVA (about 350 mg, 1.25 mmol) to a solution having a monomeric repeating unit of structure (M1) (about 18.15 mmol):

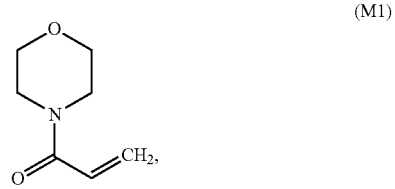

(M1)

a monomeric repeating unit of structure (M4) (about 54.45 mmol):

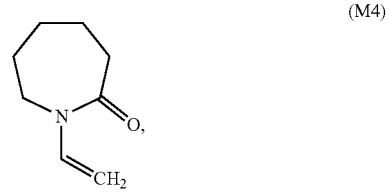

(M4)

and thioglycolic acid (995 mg, 10.8 mmol) in water (42 mL) to form a reaction mixture. The reaction mixture was heated under $N_2$ at 63° C. for 24 hours. After 24 hours, the reaction mixture was cooled to room temperature. The reaction mixture was washed with petroleum ether (3×20 mL) and freeze-dried to obtain an acryloyl-based bipolymer of structure (ABB-7):

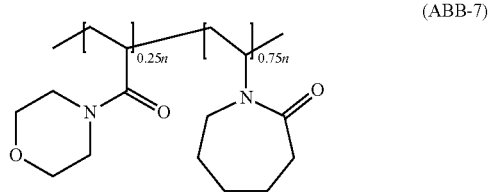

(ABB-7)

as a white product (Yield: about 90%).

Example 8: Synthesis of Acryloyl-Based
Bipolymers Having General Formula (I) in Water Materials and Methods.

Acryloyl-based bipolymers having General Formula (I) in which $R^1$ is —$(CH_2)_4$—, $R^2$ is $Q^2$ in which $R^5$ is —$(CH_2)_6$— substituted with O, $R^3$ is not present, x is about 0.25, y is about 0.75, and z is 0, were synthesized as in Example 5 except as indicated otherwise. More specifically, acryloyl-based bipolymers having General Formula (I) were synthesized by adding ABCVA (about 350 mg, 1.25 mmol) to a solution having a monomeric repeating unit of structure (M2) (about 18 mmol):

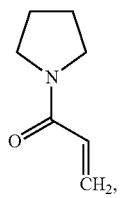

(M2)

a monomeric repeating unit of structure (M4) (about 54 mmol):

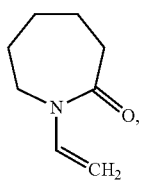

(M4)

and thioglycolic acid (about 995 mg, 10.8 mmol) in water (about 42 mL) to form a reaction mixture. The reaction mixture was heated under $N_2$ at about 63° C. for 24 hours. After 24 hours, the reaction mixture was cooled to room temperature. The reaction mixture was washed with petroleum ether (about 3×20 mL) and freeze-dried to obtain an acryloyl-based bipolymer of structure (ABB-8):

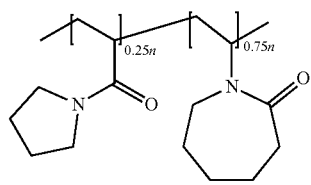

(ABB-8)

as a white product (Yield: about 88%).

Example 9: Synthesis of Acryloyl-Based Bipolymers Having General Formula (I) in Water Materials and Methods.

Acryloyl-based bipolymers having General Formula (I) in which $R^1$ is —$(CH_2)_5$—, $R^2$ is $Q^1$ in which $R^4$ is —$(CH_2)_6$—, $R^3$ is not present, x is about 0.5, y is about 0.5, and z is 0, were synthesized as in Example 2 except as indicated otherwise. More specifically, acryloyl-based bipolymers having General Formula (I) were synthesized by adding ABCVA (about 350 mg, 1.25 mmol) to a solution having a monomeric repeating unit of structure (M5) (about 5.05 g, 36.3 mmol):

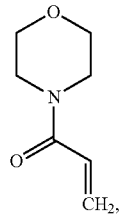

(M5, that is N-acryloylpiperidine)

a monomeric repeating unit of structure (M2) (about 4.54 g, 36.3 mmol):

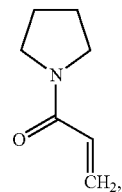

(M2)

and thioglycolic acid (995 mg, 10.8 mmol) in water (about 42 mL) under $N_2$ to form a reaction mixture. The reaction mixture was heated under $N_2$ at about 63° C. for 24 hours. After 24 hours, the reaction mixture was cooled to room temperature. The reaction mixture was washed with petroleum ether (about 3×20 mL) and freeze-dried to obtain an acryloyl-based bipolymer of structure (ABB-9):

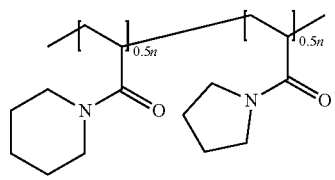

(ABB-9)

as a white product (Yield: about 94%).

Example 10: Synthesis of Acryloyl-Based Terpolymers Having General Formula (I) in Water Materials and Methods.

Acryloyl-based terpolymers (that is, ABT) having General Formula (I) in which $R^1$ is —$(CH_2)_2$—O—$(CH_2)_2$—, $R^2$ is $Q^1$ in which $R^4$ is —$(CH_2)_5$—, $R^3$ is —$(CH_2)_4$—, x is about 0.33, y is about 0.33, and z is about 0.33, were synthesized. More specifically, acryloyl-based terpolymers having General Formula (I) were synthesized by adding ABCVA (about 0.35 g, 1.25 mmol) to a solution having a monomeric repeating unit of structure (M1) (about 3.38 g, 24 mmol):

a monomeric repeating unit of structure (M5) (about 3.34 g, 24 mmol):

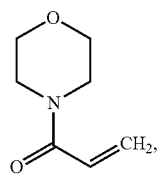
(M1)

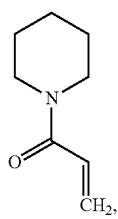
(M5)

a monomeric repeating unit of structure (M2) (about 3.0 g, 24 mmol):

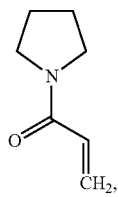
(M2)

and thioglycolic acid (about 0.995 g, 10.8 mmol) in water (about 42 mL) to form a reaction mixture. The reaction mixture was kept under $N_2$ for 20 minutes. The reaction mixture was heated under $N_2$ at about 63° C. for 24 hours. After 24 hours, the reaction mixture was cooled to room temperature to obtain a homogenous solution. The reaction mixture was washed with petroleum ether (about 3×20 mL) to remove unreactive materials. A water layer was extracted and bubbled with $N_2$ to remove soluble ether from the reaction mixture. The reaction mixture was freeze-dried to evaporate solvent and to obtain an acryloyl-based terpolymer of structure (ABT-10):

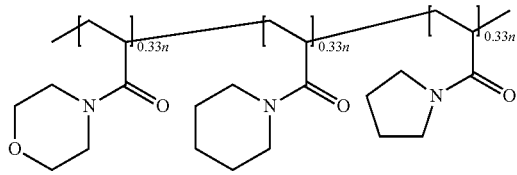
(ABT-10)

as a white product (Yield: about 87%).

Results.

Figure 2:
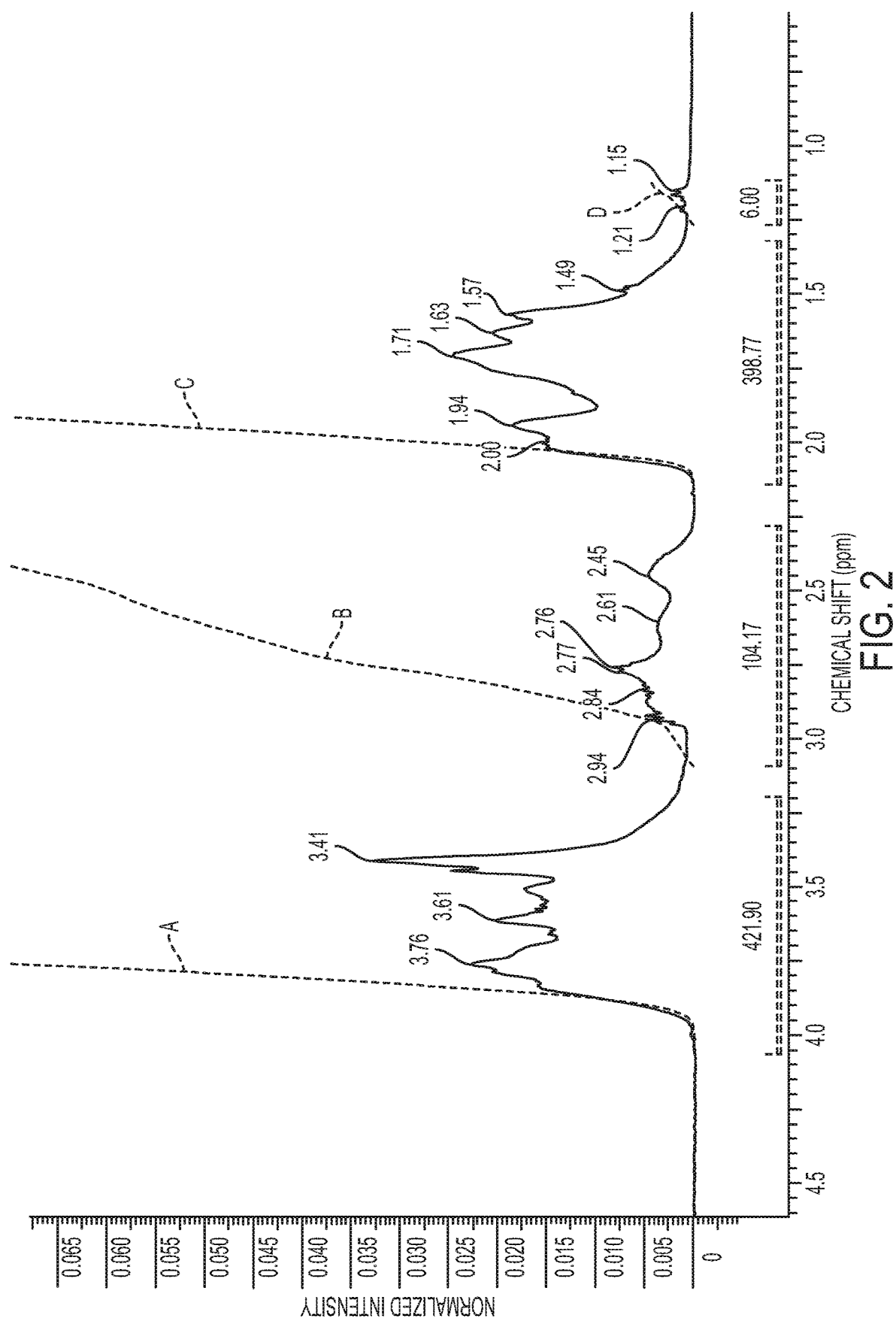
FIG. 2 is a proton nuclear magnetic resonance (that is, $^1$H-NMR) spectrum (400 megahertz, that is, MHz, $D_2O$) of acryloyl-based terpolymer having structure (ABT-10) as disclosed in Table 1, where Chemical Shift δ [parts per million, that is ppm]=3.7 (br, 12 H, $CH_2$—N—$CH_2$); 2.7 (br, 4H, $CH_2$—O—$CH_2$); or 1.7 (br, $CH_2$-block main chain and $CH_2$-in pyrrolidine and piperidine rings), and where dashed lines (A, B, C, and D) are depicted for estimating via integration the number of protons associated with spectrum peaks.
Figure 3:
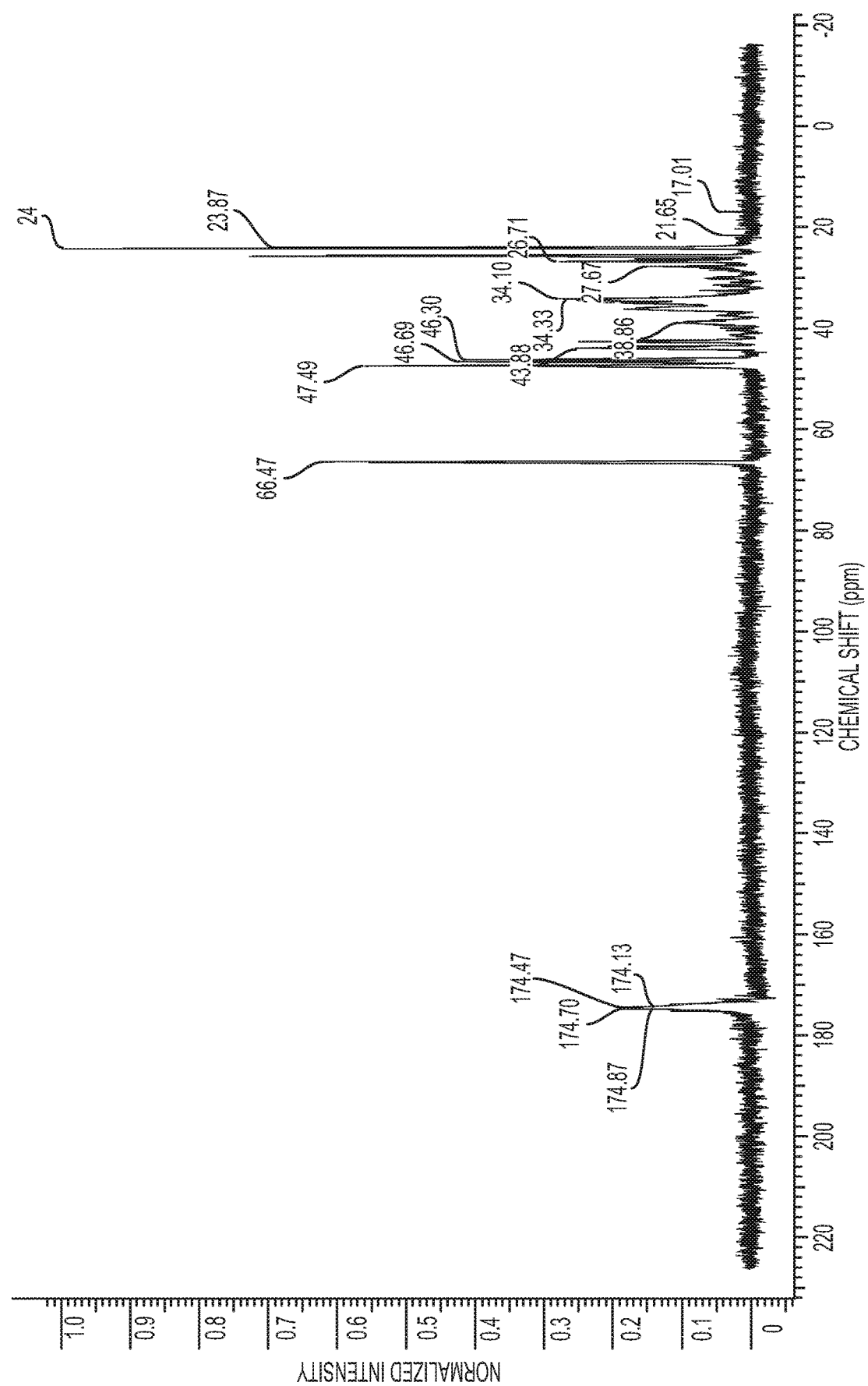
FIG. 3 is a carbon-13 nuclear magnetic resonance (that is, $^{13}$C-NMR) spectrum (100 MHz, $D_2O$) of acryloyl-based terpolymer having structure (ABT-10) as disclosed in Table 1, where Chemical Shift δ (that is, ppm)=174.5 (C=O), 66.4 ($CH_2$—O—$CH_2$), 46.8 ($CH_2$—N—$CH_2$), 43.8, 38.8, 34.2, 27.2, 23.8.

The terpolymer of structure (ABT-10) did not show a lower critical solution temperature (that is, LCST) at room temperature. The $^1$H-NMR (400 MHz, $D_2O$) and $^{13}$C-NMR spectra was carefully analyzed. For example referencing FIG. 2, the $^1$H-NMR spectrum of structure (ABT-10) (400 MHz, $D_2O$) is provided, in which: δ [PPM]=3.7 (br, 12 H, $CH_2$—N—$CH_2$); 2.7 (br, 4H, $CH_2$—O—$CH_2$); 1.7 (br, $CH_2$-block main chain and $CH_2$-in pyrrolidine and piperidine rings). Additionally, referencing FIG. 3, the $^{13}$C-NMR spectrum of structure (ABT-10) (100 MHz, $D_2O$) is provided, in which: 174.5 (C=O), 66.4 ($CH_2$—O—$CH_2$), 46.8 ($CH_2$—N—$CH_2$), 43.8, 38.8, 34.2, 27.2, 23.8. The terpolymer of structure (ABT-10) was confirmed via the spectra of FIGS. 2-3. For example, the number of protons associated with spectrum peaks can be estimated via integration thereof in FIG. 2; additionally, the formation of a polymer can be determined via the spectrum peaks in FIG. 2. Additionally, the functional groups of the terpolymer of structure (ABT-10) can be confirmed via chemical shifts in the spectrum of FIG. 3.

Example 11: Characterization of Acryloyl-Based Bipolymers' (ABB-1), (ABB-2), (ABB-3), and (ABB-4) and Acryloyl-Based Terpolymer's (ABT-10) Inhibition of Clathrate Hydrate Formation Materials and Methods.

Acryloyl-based bipolymers having structures (ABB-1), (ABB-2), (ABB-3), and (ABB-4) were synthesized as in Examples 1-4. Additionally, acryloyl-based terpolymers having structure (ABT-10) were synthesized as in Example 10. The ability of (ABB-1), (ABB-2), (ABB-3), (ABB-4), and (ABT-10) to inhibit clathrate hydrate formation was characterized. More specifically, Rocking Cells (that is, RC-5) were employed to characterize the ability of acryloyl-based copolymers having structures (ABB-1), (ABB-2), (ABB-3), (ABB-4), and (ABT-10) to inhibit clathrate hydrate formation. The RC-5 included five Hastelloy cells (PSL Systemtechnik Gmbh, Osterode am Harz, Germany) capable of operating under high pressure (that is, up to 200 bars) and in sour gas conditions. The five Hastelloy cells of the RC-5 were immersed in a temperature controlled bath containing ethylene glycol and water. During operation, the RC-5 was rocked to achieve mixing of the reactant slurry. The volume of the Hastelloy cell with a mixing ball was about 30 mL. The RC-5 enabled formation of natural gas clathrate hydrates under simulated operating conditions to test the effectiveness of the acryloyl-based copolymers having structures (ABB-1), (ABB-2), (ABB-3), (ABB-4), and (ABT-10). Data acquisition was completed with WinRC software to measure the pressure and temperature with time in each of the five Hastelloy cells.

In a typical run simulating pipeline operating conditions in the field, each of the five Hastelloy cells was charged with about 10 mL of an acryloyl-based copolymer formulation. Specifically, the 10 mL acryloyl-based copolymer formulation included an acryloyl-based copolymer (about 0.105 g), a solvent (about 0.195 g monoethylene glycol, that is, MEG), and brine (about 9.7 g), as set forth in Table 2. Then, the five Hastelloy cells were charged with a natural gas for one hour until equilibrium was reached, as described in Table 3, that is, a natural gas was added to the five Hastelloy cells, to a pressure of about 140 bars at 21° C. The brine included an aqueous solution of chloride anions, sodium cations, acetic acid, formic acid, and conjugate bases as set forth in Table 2:

TABLE 2

| Brine | | |
|---|---|---|
| Ion/Molecular Formula | Common Name | Concentration (mg/L) |
| $Cl^-$ | Chloride Anions | 607 |
| $Na^+$ | Sodium Cations | 393 |
| $CH_3COOH$ | Acetic Acid | 500 |
| HCOOH | Formic Acid | 250 |

Because natural gas in the field contains large amounts of methane, carbon dioxide, hydrogen sulfide, and nitrogen and also contains small amounts of ethane, propane, and butane, to simulate pipeline operating conditions in the field, a natural gas composition as set forth in Table 3 was employed:

TABLE 3

| Natural Gas Composition | | |
|---|---|---|
| Molecular Formula | Common Name | Mole % |
| $CH_4$ | Methane | 79.6 |
| $C_2H_6$ | Ethane | 1.4 |
| $C_3H_8$ | Propane | 0.2 |
| $C_4H_{10}$ | Butane | 0.1 |
| $CO_2$ | Carbon Dioxide | 9.2 |
| $H_2S$ | Hydrogen Sulfide | 2.3 |
| $N_2$ | Nitrogen | 7.2 |

Figure 4:
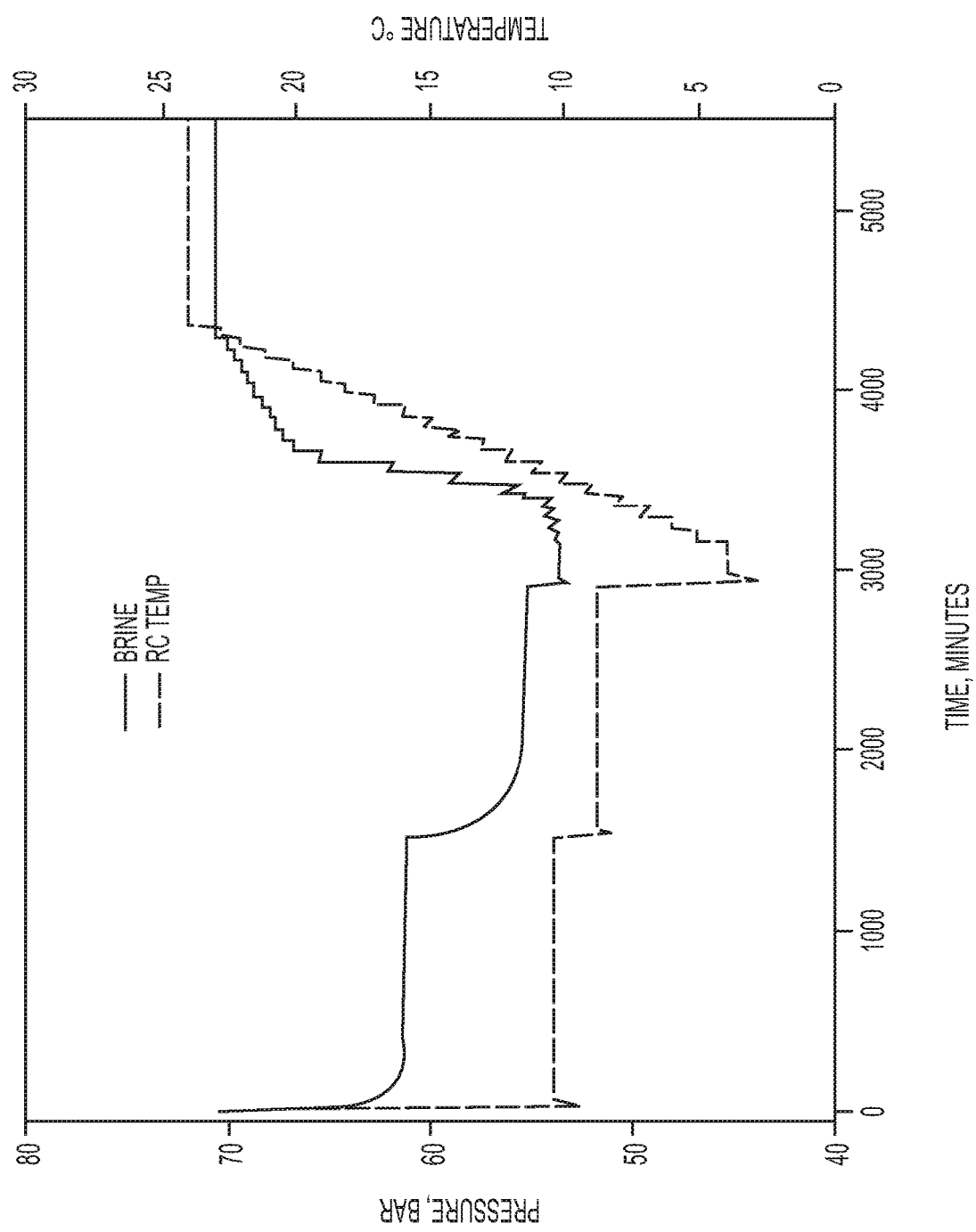
FIG. 4 is a graph of Time (Minutes) with respect to Pressure (Bar) of Brine and a graph of Time (Minutes) with respect to Temperature (degrees Celsius, that is ° C.) of Rocking Cells RC-5 (that is, RC Temp), where the Temperature (° C.) of the Rocking Cells RC-5 is programmed to change in three stages in accordance with the Starting Temperature (° C.), Average Ramp (° C./minute) and Duration (Hours) as set forth in Table 4.

Then, in this specific Example, each of the five Hastelloy cells were charged with 10 mL of an acryloyl-based copolymer formulation including acryloyl-based copolymers having structures (ABB-1), (ABB-2), (ABB-3), (ABB-4), and (ABT-10) and the brine of Table 2. Each acryloyl-based copolymer structure was tested separately, that is, two different acryloyl-based copolymer structures were not paired together in a single test. Then, the five Hastelloy cells were charged with a natural gas, as described in Table 3, to a pressure of about 140 bars at 21° C. Referencing FIG. 4, the RC-5 was then programmed to change temperature at three operation stages as set forth generally in Table 4. More specifically, the RC-5 was programmed to change temperature at three operation stages, where Stage 1 was from between about 0 to 1500 minutes, Stage 2 was from about 1500 to 3000 minutes, and Stage 3 was from about 3000 to 32000 minutes.

TABLE 4

| Programmed Temperature Stages in the RC-5 - Program 1 | | | | |
|---|---|---|---|---|
| Stage | Starting Temperature (° C.) | Average Ramp (° C./minute) | $T_{sc}$ (° C./min) | Duration (hours) |
| 1 | 14.6 | 0.1 | 4 | 24 to 120 |
| 2 | 13 | 0.1 | 5.6 | 24 to 48 |
| 3 | 8.1 | 0.08 | 10.5 | 2 to 6 |

The three-phase equilibrium temperature (that is, liquid, vapor, and hydrate) of clathrate hydrates in the natural gas composition of Table 3 was calculated via methods known to those of ordinary skill in the art. The calculated equilibrium curve of hydrate formation showed the three-phase equilibrium temperature of about 18.6° C. at 140 bars. Moreover, the pressure changes for liquid, vapor, and hydrate phases were accounted for by employing a mass balance of the natural gas composition so that pressure changes were accurately attributed to clathrate hydrate formation. More specifically, in embodiments, the ability of acryloyl-based copolymers to inhibit clathrate hydrate formation was evaluated by assessing the pressure during each of the operation stages at the various subcooling temperatures, where a stable pressure was determined to be indicative of clathrate hydrate inhibition.

The ability of acryloyl-based copolymers having structures (ABB-1), (ABB-2), (ABB-3), (ABB-4), and (ABT-10) to inhibit clathrate hydrate formation was evaluated at three subcooling temperatures: about 4.0° C., about 5.6° C., and about 10.5° C. The ability of acryloyl-based copolymers having structures (ABB-1), (ABB-2), (ABB-3), (ABB-4), and (ABT-10) to inhibit clathrate hydrate formation was evaluated at three subcooling temperatures to determine the induction period and the temperature at which clathrate hydrate formation occurred.

Results.

Figure 5:
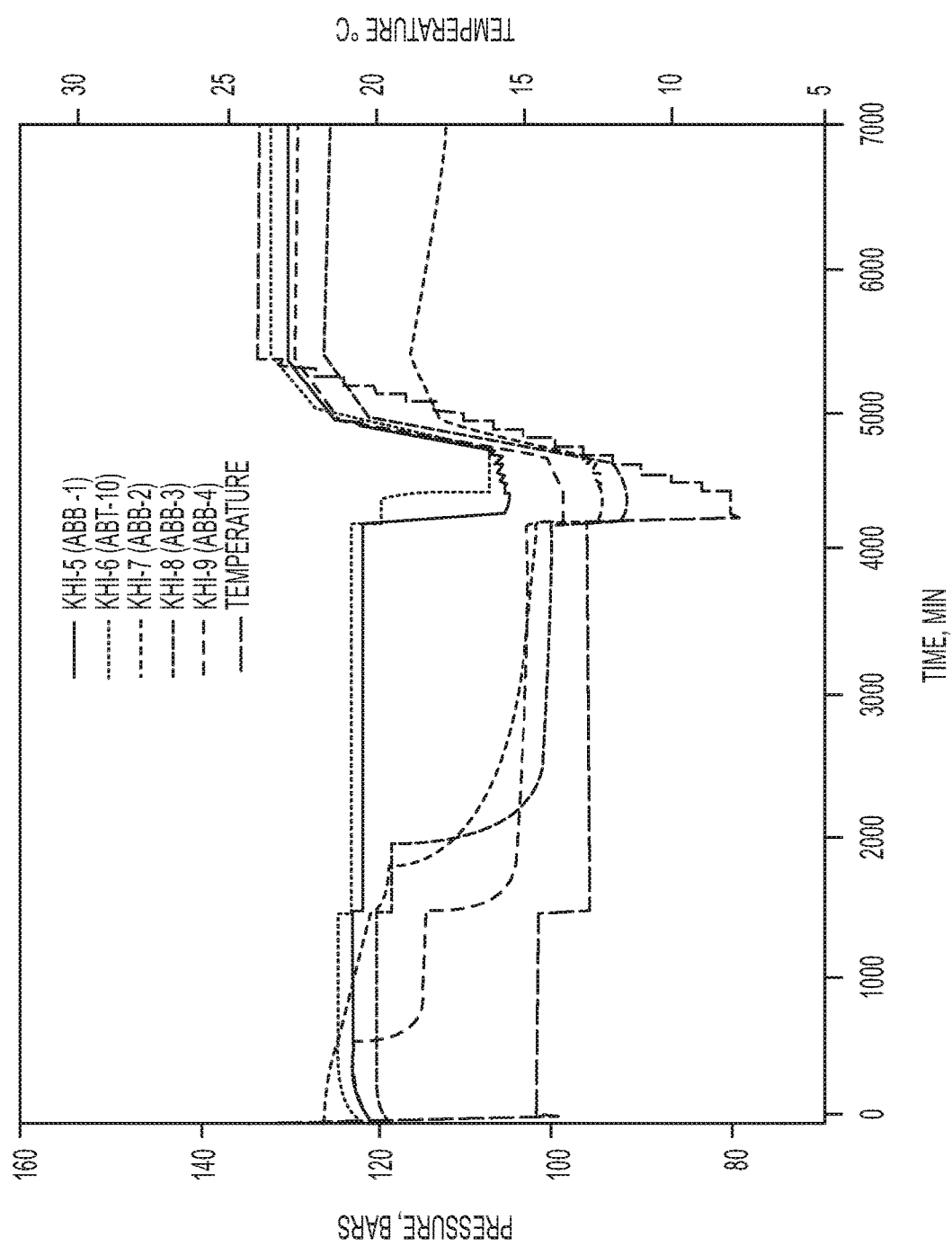
FIG. 5 is a graph of Time (Minutes, that is Min) with respect to Pressure (Bars) of acryloyl-based bipolymers having structure (ABB-1) (that is, KHI-5), (ABB-2) (that is, KHI-7), (ABB-3) (that is, KHI-8), and (ABB-4) (that is, KHI-9) as disclosed in Table 1 and of acryloyl-based terpolymers having structure (ABT-10) (that is, KHI-6) as disclosed in Table 1, and a graph of Time (Min) with respect to Temperature (° C.) of the Rocking Cells RC-5 (that is, Temperature), where the Temperature (° C.) of the Rocking Cells RC-5 is programmed to change in three stages in accordance with the Starting Temperature (° C.), Average Ramp (° C./minute) and Duration (Hours) as set forth in Table 4.

As shown in FIG. 5, the acryloyl-based bipolymer having structure (ABB-1) was an effective inhibitor of clathrate hydrate formation at both a first subcooling temperature of 4.0° C. and a second subcooling temperature of 5.6° C. Additionally, as also shown in FIG. 5, the acryloyl-based terpolymer having structure (ABT-10) was an effective inhibitor of clathrate hydrate formation at both a first subcooling temperature and a second subcooling temperature.

Example 12: Characterization of Acryloyl-Based Bipolymers' (ABB-5), (ABB-6), (ABB-7), and (ABB-8) and Polyvinylcaprolactam's Inhibition of Clathrate Hydrate Formation Materials and Methods.

Acryloyl-based bipolymers having structures (ABB-5), (ABB-6), (ABB-7), and (ABB-8) were synthesized as in Examples 5-8. The ability of (ABB-5), (ABB-6), (ABB-7), and (ABB-8) to inhibit clathrate hydrate formation was characterized as in Example 11. Polyvinylcaprolactam (that is, PVcap) was synthesized by adding ABCVA (about 350 mg, 1.25 mmol) to a solution having a monomeric repeating unit of structure (M4) (about 10.0 g, 72 mmol):

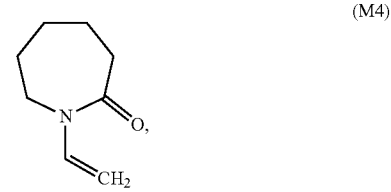

(M4)

and and thioglycolic acid (995 mg, 10.8 mmol) in water (about 42 mL) under $N_2$ to form a reaction mixture. The reaction mixture was stirred under $N_2$ at about 70° C. using a magnetic stir-bar for about 3 h. After the elapsed time, the reaction mixture was cooled to room temperature and washed with petroleum ether (about 3×20 mL) and freeze-dried to obtain PVcap as a colorless liquid (Yield: about 94%). The obtained PVcap did not show any LCST at room temperature or even at 60° C.

Results.

Figure 6:
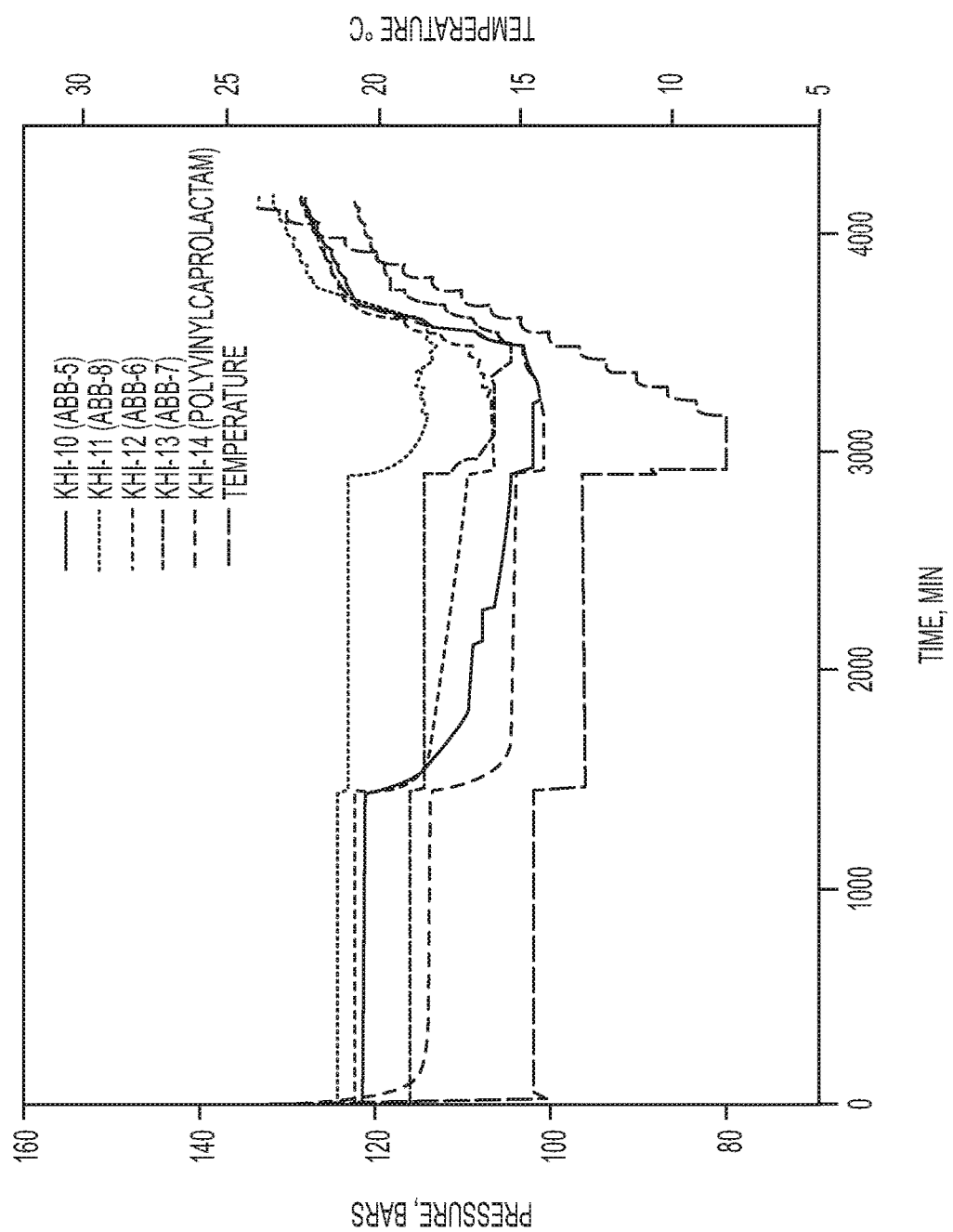
FIG. 6 is a graph of Time (Min) with respect to Pressure (Bars) of acryloyl-based bipolymers having structure (ABB-5) (that is, KHI-10), (ABB-6) (that is, KHI-12), (ABB-7) (KHI-13), and (ABB-8) (that is, KHI-11) as disclosed in Table 1 and of polyvinylcaprolactam (that is, KHI-14), and a graph of Time (Min) with respect to Temperature (° C.) of the Rocking Cells RC-5 (that is, Temperature), where the Temperature (° C.) of the Rocking Cells RC-5 is programmed to change in three stages in accordance with the Starting Temperature (° C.), Average Ramp (° C./minute) and Duration (Hour) as set forth in Table 4.

As shown in FIG. 6, the acryloyl-based bipolymers having structures (ABB-5), (ABB-6), and (ABB-7) were effective inhibitors of clathrate hydrate formation at a first subcooling temperature of 4.0° C. Additionally, as also shown in FIG. 6, the acryloyl-based bipolymer having structure (ABB-8), was an effective inhibitor of clathrate hydrate formation at a first subcooling temperature of 4.0° C. and at a second subcooling temperature of 5.6° C. Moreover, minimal clathrate hydrate was formed at a third subcooling temperature 10.5° C. in the presence of acryloyl-based bipolymer having structure (ABB-8). PVcap was not an effective inhibitor of clathrate hydrate formation at any subcooling temperature.

Example 13: Characterization of Acryloyl-Based Bipolymers' (ABB-9) and (ABB-15) Inhibition of Clathrate Hydrate Formation Materials and Methods.

Acryloyl-based bipolymer having structure (ABB-9) was synthesized as in Example 9. Acryloyl-based bipolymer having structure (ABB-15) was synthesized as in Example 15, described subsequently. The ability of (ABB-9) and (ABB-15) to inhibit clathrate hydrate formation was characterized as in Example 11.

Results.

Figure 7:
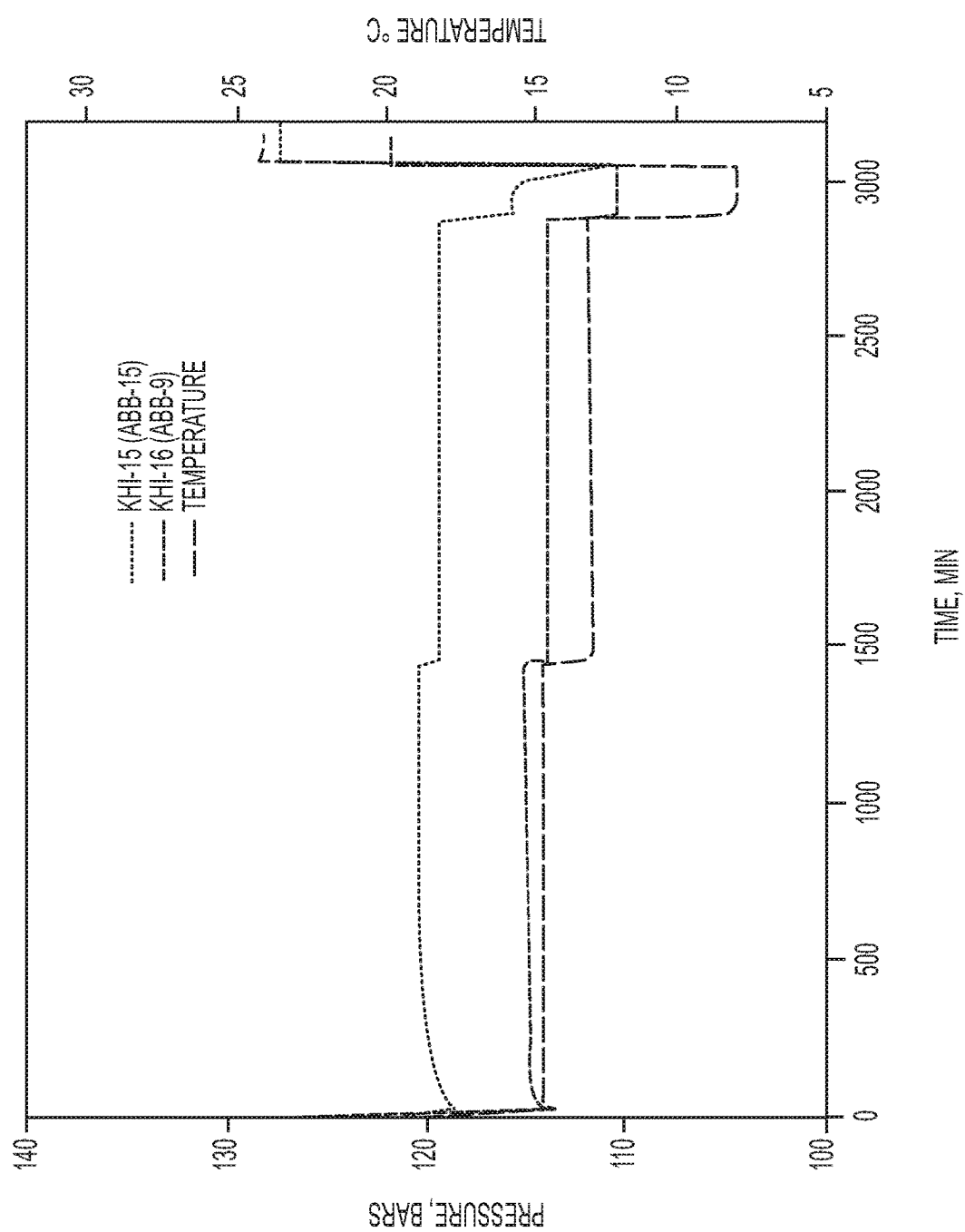
FIG. 7 is a graph of Time (Min) with respect to Pressure (Bars) of acryloyl-based bipolymers having structure (ABB-9) (that is, KHI-16) and of acryloyl-based terpolymers having structure (ABB-15) (that is, KHI-15) as disclosed in Table 1, and a graph of Time (Min) with respect to Temperature (° C.) of the Rocking Cells RC-5 (that is, Temperature), where the Temperature (° C.) of the Rocking Cells RC-5 is programmed to change in three stages in accordance with the Starting Temperature (° C.), Average Ramp (° C./minute) and Duration (Hours) as set forth in Table 4.

As shown in FIG. 7, the acryloyl-based bipolymer having structure (ABB-9) was an effective inhibitor of clathrate hydrate formation at a first subcooling temperature of 4.0° C., a second subcooling temperature of 5.6° C., and a third subcooling temperature of 10.5° C. Additionally, as also shown in FIG. 7, the acryloyl-based bipolymer having structure (ABB-15) was an effective inhibitor of clathrate hydrate formation at a first subcooling temperature of 4.0° C. and at a second subcooling temperature of 5.6° C.

Example 14: Characterization of Ability of Acryloyl-Based Homopolymers Having Structures (ABH-11)-(ABH-14) to Inhibit Clathrate Hydrate Formation Materials and Methods.

Acryloyl-based homopolymers (that is, ABH) having structures (ABH-11), (ABH-12), (ABH-13), and (ABH-14) were synthesized. Acryloyl-based homopolymers having structures (ABH-11), (ABH-12), (ABH-13), and (ABH-14) are shown:

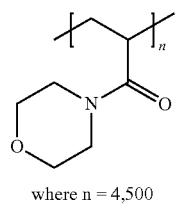

(ABH-11)

where n = 4,500

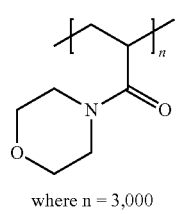

(ABH-12)

where n = 3,000

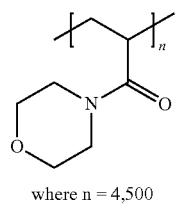

(ABH-13)

where n = 6,000

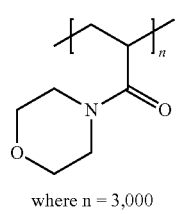

(ABH-14)

where n = 100,000

Specifically, (ABH-11) was synthesized by adding ABCVA (about 0.35 g, 1.25 mmol) to a solution having a monomeric repeating unit of structure (M1) (about 72 mmol):

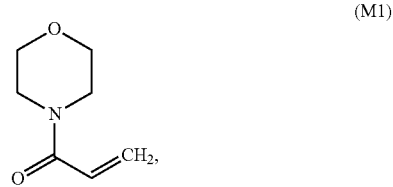

(M1)

and thioglycolic acid (about 0.166 g, 1.80 mmol) in water (about 42 mL) under $N_2$ to form a reaction mixture. The reaction mixture was kept under $N_2$ for about 20 minutes. The reaction mixture was heated under $N_2$ at about 63° C. using a magnetic stir-bar for about 24 hours. After 24 hours, the reaction mixture was cooled to room temperature to obtain a homogenous solution. The reaction mixture was then washed with petroleum ether (about 3×20 mL) and freeze-dried to obtain (ABH-11) (Yield: about 96%) as a white powder.

Similarly, (ABH-12) was synthesized by adding ABCVA (about 0.35 g, 1.25 mmol) to a solution having a monomeric repeating unit of structure (M1) (about 72 mmol):

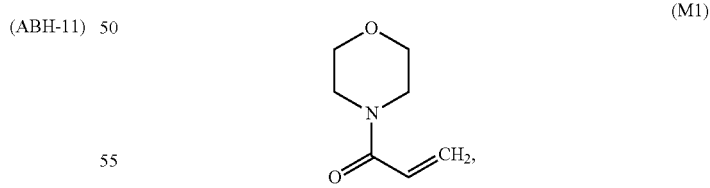

(M1)

and thioglycolic acid (about 334 mg, 3.60 mmol) in water (about 42 mL) under $N_2$ to form a reaction mixture. The reaction mixture was kept under $N_2$ for about 20 minutes. The reaction mixture was heated under $N_2$ at about 63° C. using a magnetic stir-bar for about 24 hours. After 24 hours, the reaction mixture was cooled to room temperature to obtain a homogenous solution. The reaction mixture was then washed with petroleum ether (about 3×20 mL) and freeze-dried to obtain (ABH-12) (Yield: about 94%) as a white powder.

Similarly, (ABH-13) was synthesized by adding ABCVA (about 0.35 g, 1.25 mmol) to a solution having a monomeric repeating unit of structure (M1) (about 72 mmol):

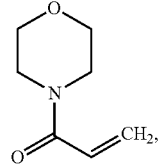
(M1)

and thioglycolic acid (about 111 mg, 1.20 mmol) in water (about 42 mL) under $N_2$ to form a reaction mixture. The reaction mixture was kept under $N_2$ for about 20 minutes. The reaction mixture was heated under $N_2$ at about 63° C. using a magnetic stir-bar for about 24 hours. After 24 hours, the reaction mixture was cooled to room temperature to obtain a homogenous solution. The reaction mixture was then washed with petroleum ether (about 3×20 mL) and freeze-dried to obtain (ABH-13) (Yield: about 95%) as a white powder.

(ABH-14) was synthesized by polymerizing a solution of monomeric repeating unit of structure (M1) (about 12.0 g, 85 mmol):

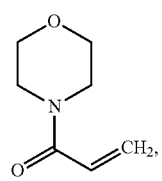
(M1)

and in water (about 300 mL) using $K_2S_2O_8$ (about 2 g) at 50° C. under $N_2$ for about 1.5 hours. The solution was dropped into acetone to obtain (ABH-14) (Yield: about 100%) as a white polymer.

The ability of (ABH-11), (ABH-12), (ABH-13), and (ABH-14) to inhibit clathrate hydrate formation was characterized as in Example 11.

Results.

Figure 8:
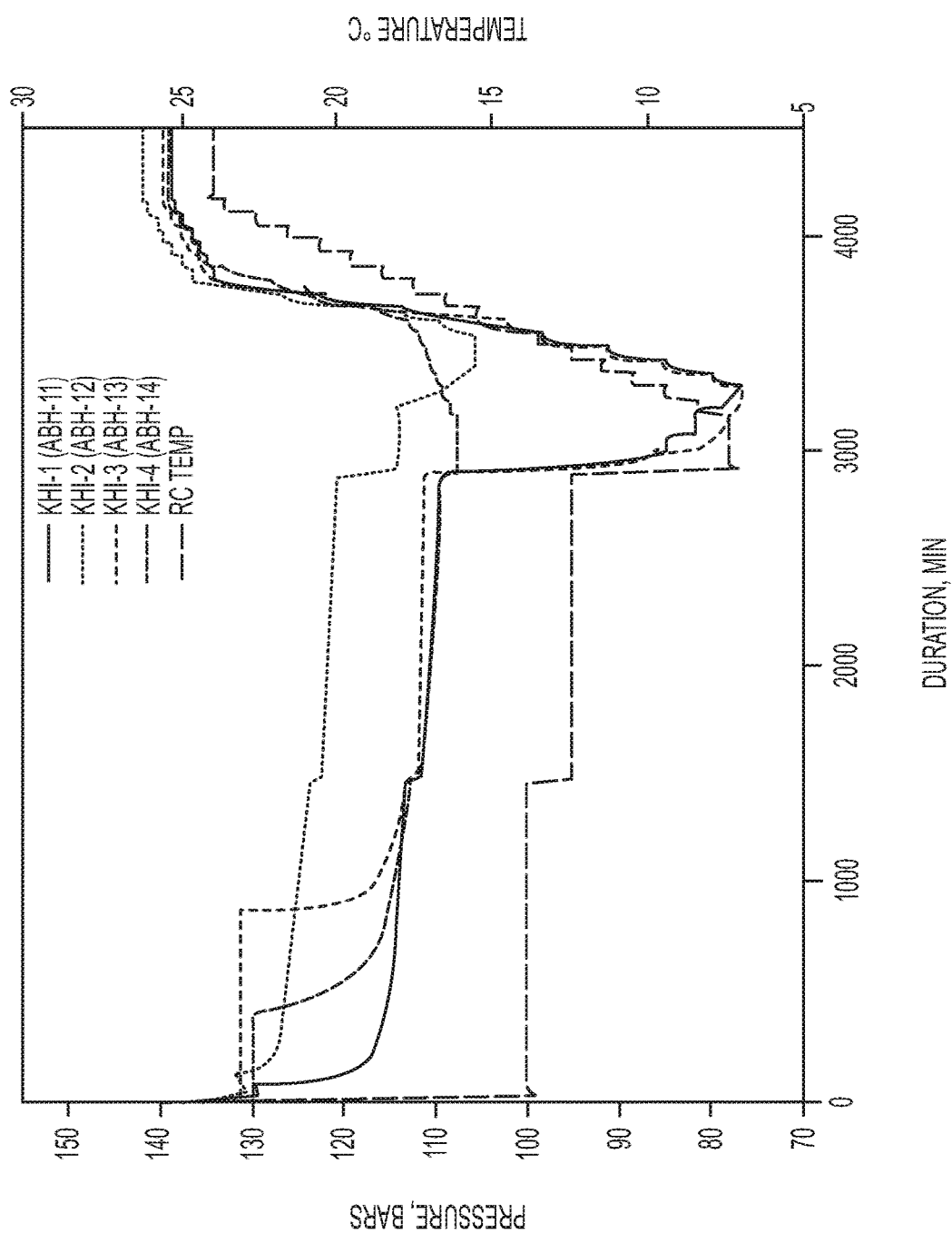
FIG. 8 is a graph of Duration (Min) with respect to Pressure (Bars) of acryloyl-based homopolymers having structure (ABH-11) (that is, KHI-1), (ABH-12) (that is, KHI-2), (ABH-13) (that is, KHI-3), and (ABH-14) (that is, KHI-4), and a graph of Duration (Min) with respect to Temperature (° C.) of the Rocking Cells RC-5 (that is, RC Temp), where the Temperature (° C.) of the Rocking Cells RC-5 is programmed to change in three stages in accordance with the Starting Temperature (° C.), Average Ramp (° C./minute) and Duration (Hours) as set forth in Table 4.

As shown in FIG. 8, the acryloyl-based homopolymers having structures (ABH-11), (ABH-12), (ABH-13), and (ABH-14) were not effective inhibitors of clathrate hydrate formation at any subcooling temperature.

Example 15: Synthesis of Acryloyl-Based Bipolymers Having General Formula (I)

Materials and Methods.

Acryloyl-based bipolymers (that is, ABB) having General Formula (I) in which $R^1$ is —$(CH_2)_2$—O—$(CH_2)_2$—, $R^2$ is $Q^1$ in which $R^4$ is —$(CH_2)_5$—, $R^3$ is not present, x is about 0.5, y is about 0.5, and z is 0, were synthesized. Specifically, acryloyl-based bipolymers having General Formula (I) were synthesized by adding ABCVA (about 350 milligrams, that is mg, 1.25 mmol) to a solution having a monomeric repeating unit of structure (M1) (about 36.3 mmol):

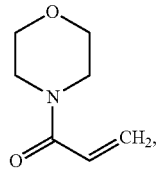
(M1)

a monomeric repeating unit of structure (M5) (about 36.3 mmol):

(M5)

and thioglycolic acid (about 995 mg, 10.8 mmol) in water (about 42 mL) to form a reaction mixture. The reaction mixture was heated under $N_2$ at about 63° C. for 24 hours. After 24 hours, the reaction mixture was cooled to room temperature. The reaction mixture was washed with petroleum ether (about 3×20 mL) and freeze-dried to obtain an acryloyl-based bipolymer of structure (ABB-15):

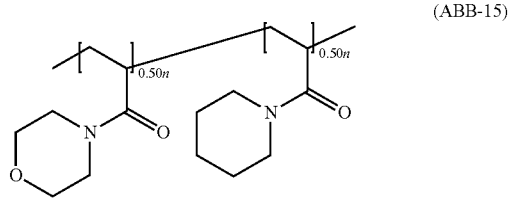
(ABB-15)

as a white product (Yield: about 88%).

It will be apparent to those skilled in the art that various modifications and variations can be made to the embodiments described in this disclosure without departing from the spirit and scope of the claimed subject matter. Thus it is intended that this disclosure cover the modifications and variations of the various embodiments described provided such modifications and variations come within the scope of the appended claims and their equivalents.

It is noted that terms like "generally," "commonly," and "typically" are not utilized to limit the scope of the claims or to imply that certain features are critical, essential, or even important to the structure or function of the claims. Rather, these terms are merely intended to highlight alternative or additional features that may or may not be utilized in a particular embodiment of the present disclosure.

It is to be further understood that where descriptions of various embodiments use the term "comprising," or "including" those skilled in the art would understand that in some specific instances, an embodiment can be alternatively described using language "consisting essentially of" or "consisting of."

Unless otherwise indicated, all numbers expressing quantities of ingredients, properties such as reaction conditions, and so forth used in the disclosure and claims are to be understood as being modified in all instances by the term "about." Accordingly, unless indicated to the contrary, the numerical parameters set forth in this disclosure and claims are approximations that can vary depending upon the desired properties sought to be obtained by the presently-disclosed subject matter.

It should be understood that every maximum numerical limitation given throughout this disclosure includes every lesser numerical limitation, as if such lesser numerical limitations were expressly written in this disclosure. Every minimum numerical limitation given throughout this disclosure will include every greater numerical limitation, as if such greater numerical limitations were expressly written in this disclosure. Every numerical range given throughout this disclosure will include every narrower numerical range that falls within such broader numerical range, as if such narrower numerical ranges were all expressly written in this disclosure.

Unless otherwise defined, all technical and scientific terms used in this disclosure have the same meaning as commonly understood by one of ordinary skill in the art to which the claimed subject matter belongs. The terminology used in this disclosure is for describing particular embodiments only and is not intended to be limiting. As used in the disclosure and appended claims, the singular forms "a," "an," and "the" are intended to include the plural forms as well, unless the context clearly indicates otherwise.

What is claimed is:

1. A terpolymer having General Formula (I):

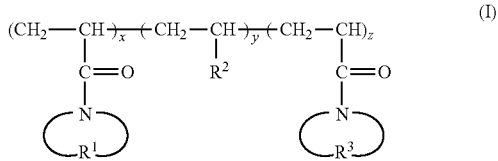

in which:
R$^1$ and R$^3$ are each independently chosen from divalent C$_4$-C$_7$ aliphatic groups and divalent C$_4$-C$_7$ heteroaliphatic groups, optionally substituted with one or more C$_1$-C$_6$ aliphatic groups, heteroatoms independently chosen from O, N, and S, or combination thereof, where:
the divalent C$_4$-C$_7$ heteroaliphatic groups of R$^1$ and R$^3$ comprise one or two heteroatoms independently chosen from O, N, and S, and
the maximum number of heteroatoms in R$^1$ or R$^3$ is two;

R$^2$ is Q$^1$:

in which:
R$^4$ is chosen from divalent C$_4$-C$_7$ aliphatic groups and divalent C$_4$-C$_7$ heteroaliphatic groups, optionally substituted with one or more C$_1$-C$_6$ aliphatic groups;
x is a molar fraction range from 0.1 to less than 0.9;
y is a molar fraction range from 0.1 to less than 0.9; and
z is a molar fraction range from greater than 0 to 0.8, where the summation of x, y, and z equals 1.

2. The terpolymer of claim 1, where R$^1$ is chosen from divalent C$_4$-C$_6$ linear heteroaliphatic groups.

3. The terpolymer of claim 1, where R$^4$ is chosen from divalent C$_4$-C$_6$ linear aliphatic groups.

4. The terpolymer of claim 1, where:
R$^4$ is chosen from divalent C$_4$-C$_6$ linear aliphatic groups, and R$^4$ is substituted with one or more C$_1$-C$_3$ aliphatic groups.

5. The terpolymer of claim 1, where R$^3$ is chosen from divalent C$_4$-C$_6$ linear aliphatic groups and divalent C$_4$-C$_6$ linear heteroaliphatic groups.

6. The terpolymer of claim 1, where:
R$^1$ is chosen from divalent C$_4$-C$_6$ linear aliphatic groups and divalent C$_4$-C$_6$ linear heteroaliphatic groups,
R$^3$ is chosen from divalent C$_4$-C$_6$ linear aliphatic groups and divalent C$_4$-C$_6$ linear heteroaliphatic groups,
R$^4$ is chosen from divalent C$_4$-C$_6$ linear aliphatic groups and divalent C$_4$-C$_6$ linear heteroaliphatic groups,
x is a molar fraction range of from 0.25 to 0.5,
y is a molar fraction range of from 0.25 to 0.5,
z is a molar fraction range of from 0.25 to 0.5.

7. The terpolymer of claim 1, where:
x is a molar fraction range of from 0.25 to 0.5,
y is a molar fraction range of from 0.25 to 0.5, and
z is a molar fraction range of from 0.25 to 0.5.

8. The terpolymer of claim 1, where the viscosity average molecular weight of the terpolymer is in the range of from 500 g/mol to 1,000,000 g/mol.

9. The terpolymer of claim 1, where R$^1$ is —(CH$_2$)$_2$—O—(CH$_2$)$_2$—, R$^4$ is —(CH$_2$)$_5$—, and R$^3$ is —(CH$_2$)$_4$—.

10. The terpolymer of claim 9, wherein x is 0.33, y is 0.33, and z is 0.33.

* * * * *